United States Patent [19]

Rice

[11] Patent Number: 4,550,562
[45] Date of Patent: Nov. 5, 1985

[54] METHOD OF STEAM COOLING A GAS GENERATOR

[76] Inventor: Ivan G. Rice, P.O. Box 233, Spring, Tex. 77373

[21] Appl. No.: 416,173

[22] Filed: Sep. 9, 1982

Related U.S. Application Data

[60] Continuation-in-part of Ser. No. 274,660, Jun. 17, 1981, Pat. No. 4,384,452, and a continuation-in-part of Ser. No. 224,496, Jan. 13, 1981, Pat. No. 4,438,625, which is a division of Ser. No. 954,832, Oct. 26, 1978, Pat. No. 4,272,953, said Ser. No. 274,660, is a division of Ser. No. 47,571, Jun. 11, 1979, Pat. No. 4,314,442.

[51] Int. Cl.⁴ .......................... F02C 7/143; F02C 7/16
[52] U.S. Cl. ..................................... 60/39.02; 60/728
[58] Field of Search ............... 60/39.02, 39.182, 39.19, 60/39.53, 39.54, 39.55, 39.58, 39.59, 728, 730; 415/114, 115, 116, 117, 177, 178, 179, 180

[56] References Cited

U.S. PATENT DOCUMENTS

| | | | |
|---|---|---|---|
| 1,708,402 | 4/1929 | Schilling | 60/39.19 |
| 2,241,782 | 5/1941 | Jendrassik | 415/180 |
| 2,586,025 | 2/1952 | Godfrey | 60/39.182 |
| 4,333,309 | 6/1982 | Coronel | 60/39.182 |

FOREIGN PATENT DOCUMENTS

| | | | |
|---|---|---|---|
| 955011 | 7/1951 | France | 415/114 |
| 309450 | 1/1930 | United Kingdom . | |

Primary Examiner—Louis J. Casaregola
Attorney, Agent, or Firm—Stuart D. Frenkel

[57] ABSTRACT

A reheat gas and double reheat steam turbine combined cycle is provided in which the outer compressor shell and gas generator turbine are cooled with steam to control tip clearance of the rotating blades of the compressor and gas generator turbine with the respective shells which confine the blading. Steam cooling of the gas generator turbine blading as well as the low and high pressure gas generator shafts are also provided.

9 Claims, 20 Drawing Figures

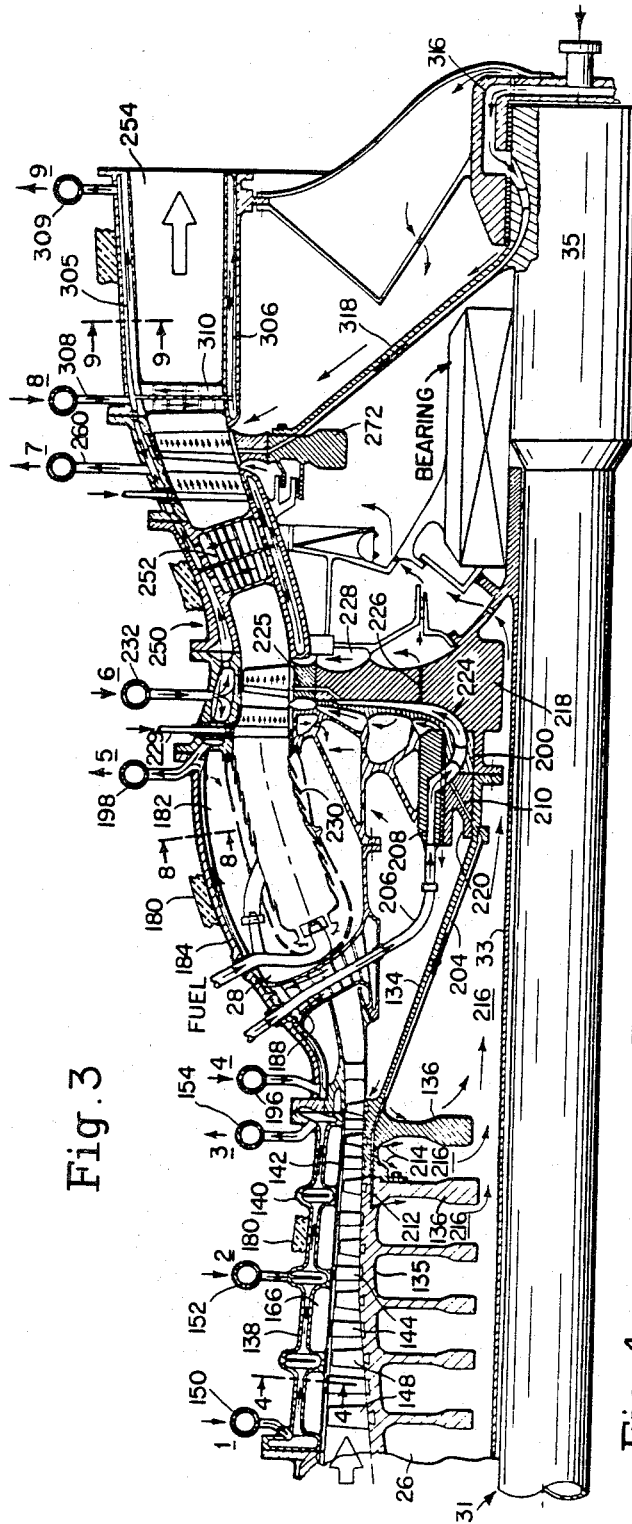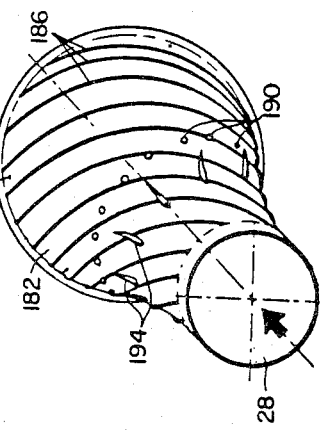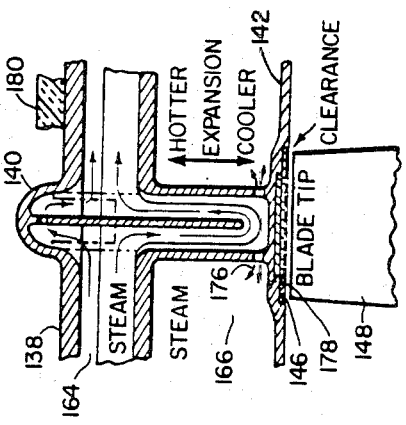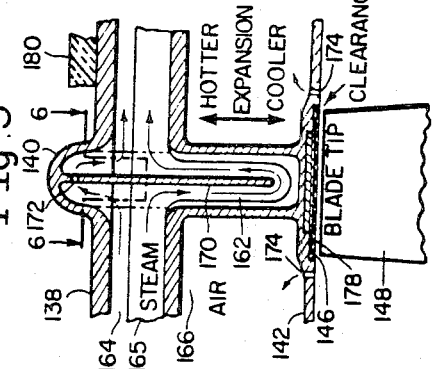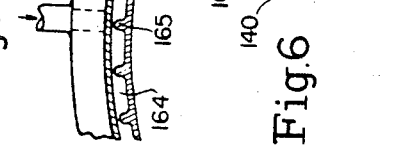

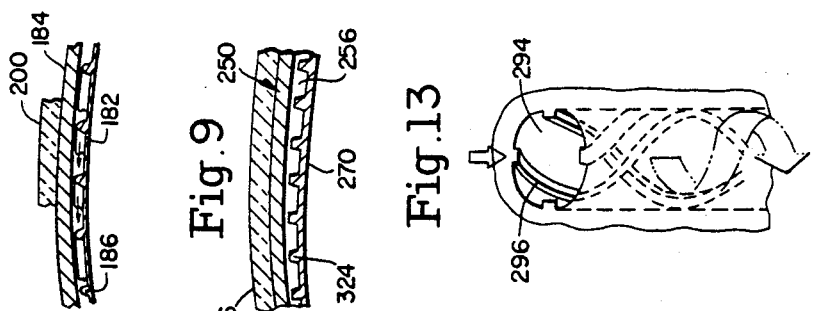
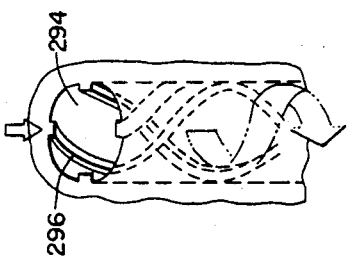
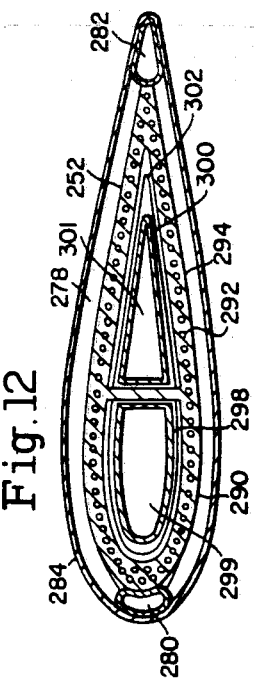
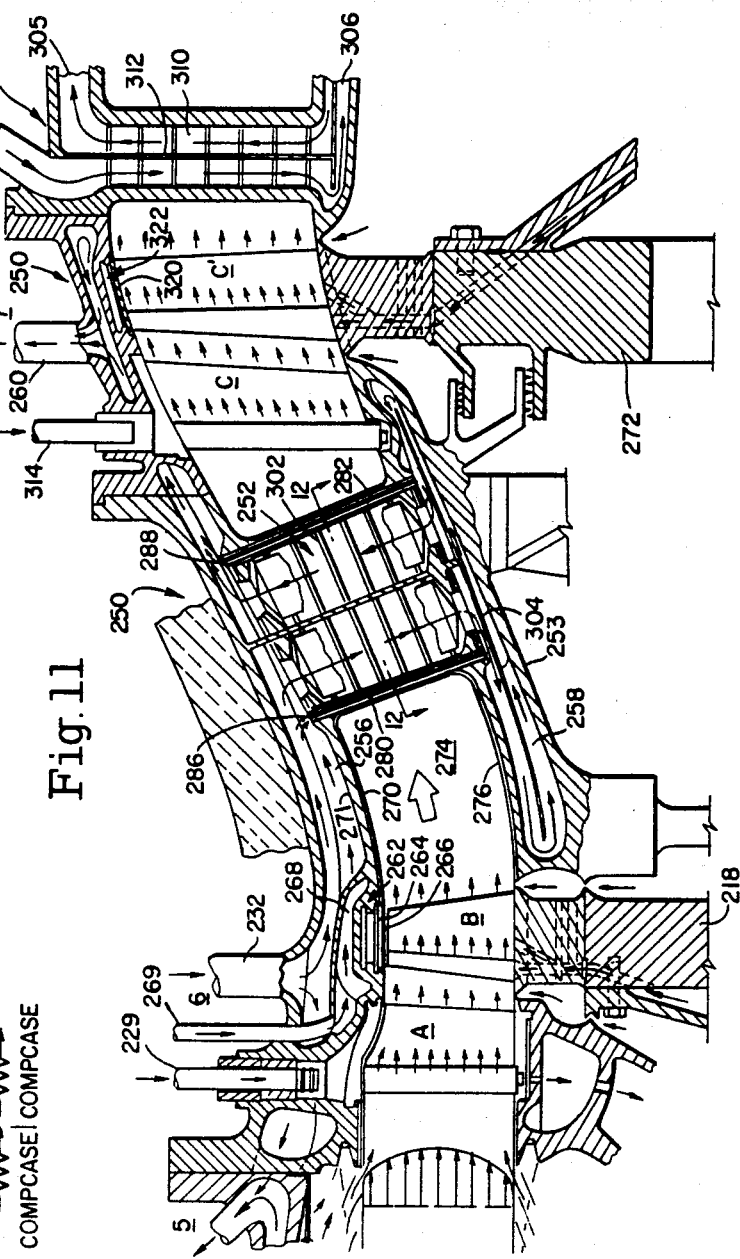
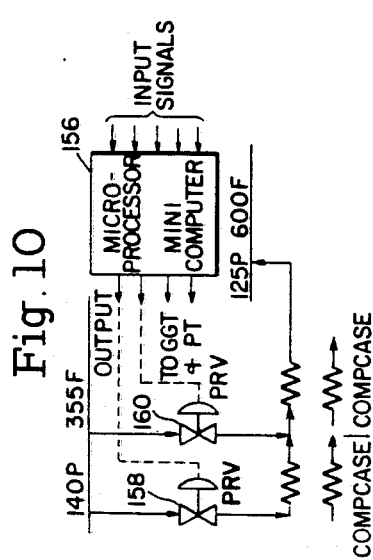

METHOD OF STEAM COOLING A GAS GENERATOR

CROSS REFERENCE TO RELATED APPLICATIONS

This application is a continuation-in-part of U.S. Ser. No. 274,660, filed June 17, 1981 (U.S. Pat. No. 4,384,452), which is a Division of U.S. Ser. No. 47,571, filed June 11, 1979, now U.S. Pat. No. 4,314,442.

This application is also a continuation-in-part of U.S. Ser. No. 224,496, filed Jan. 13, 1981 (U.S. Pat. No. 4,438,625), which is a Division of U.S. Ser. No. 954,832, filed Oct. 26, 1978, now U.S. Pat. No. 4,272,953.

FIELD OF THE INVENTION

This invention relates to improvements in the reheat gas turbine and, more particularly, to a reheat gas turbine/steam turbine combined cycle with steam cooling of the gas generator and power turbine. The invention further relates to a process of performing work using a steam cooled reheat gas turbine.

In U.S. Pat. No. 4,272,953, applicant has disclosed that second generation high-cycle pressure-ratio, high-firing temperature gas generators can be used in the reheat gas turbine/steam turbine combined cycle to yield increased efficiency and output heretofore unexpected from reheat gas combined cycles. A novel reheat gas turbine without intercooling combined with a steam turbine is further disclosed in applicant's pending application, U.S. Ser. No. 224,496, filed Jan. 10, 1981. In this pending application, the reheat gas turbine comprises a juxtaposed and axially aligned gas generator and power turbine in which gas flow through the gas generator, reheat combustor and power turbine is substantially linear throughout.

In U.S. Pat. No. 4,314,442, applicant has disclosed that steam extracted from the steam turbine in a reheat gas turbine/steam turbine combined cycle can be used to cool the reheat gas turbine vanes and rotating blades. Steam cooling is shown to offer advantages over cooling with air or water at the higher temperatures which are possible in the reheat gas turbine/steam turbine combined cycle described in U.S. Pat. No. 4,272,953. As described in U.S. Pat. No. 4,314,442, the extracted steam is directed as a thermal barrier over the reheat gas turbine vanes and rotating discs and blades from internal steam plenums within the respective vanes and blades. Internal steam convective cooling of the gas turbine rotating blades is also beneficially used. The heated coolant steam is eventually ejected into the gas stream. It has been found that gas generator work is obtained by ejecting the coolant into the gas stream and reheat pressure and reheat temperature are raised as well.

The reheat gas turbine power output and associated reheat gas turbine and steam turbine combined cycle efficiency is, however, limited by the exhaust temperature. The reheat-firing temperature is also limited as a result. The large physical size of the power turbine last-stage blading, support struts, outer casing, inner barrel and exhaust hood imposes strength and material challenges in view of the high temperature environment. Thus, where extensive exiting cooling is not contemplated, a low exhaust ceiling must be set. Such a temperature restraint in turn results in a modest reheat temperature (2200° F.) that has been contemplated. A 2200° F. reheat temperature can be considered modest in view of the future advancements being made in blade cooling by air (transpiration), water, and steam where a reheat temperature of 2400° to 2600° F. is within reach. This higher reheat temperature would be compatible with the proposed inlet temperature of 2600° F. of the gas generators presently being developed. Accordingly, important objects of the present invention include overcoming the limitation of reheat-firing temperature and realizing the improvement in terms of output and cycle efficiency which is possible when a reheat gas turbine containing a second generation gas generator having a high-cycle pressure ratio (38–42) and high firing temperature (2600° F.) is combined with a steam turbine.

Aircraft and industrial gas turbines with cycle pressure ratios of 5 to 7 and with firing temperatures of 1400° to 1500° F. have in the past been designed to operate satisfactorily through the proper material selection and known design procedures. Tip clearances of the compressor and turbine rotating blades with respect to the stationary casings were important, but not overly critical to the operation of the engines. No special cooling techniques were necessary to control tip clearance for these low-cycle ratios.

Today, engines with cycle-pressure ratios of 20 to 30 have been in service for a number of years (aircraft:CF6, JP9, RB-211; and industrial: LM 2500, LM 5000, and RB-211). Material selection and cooling techniques have been developed to match the expansion of the discs and the rotating blades with the expansion of the stator parts, struts and casings to retain acceptable blade-tip clearances. Presently, commercial-jet engines are being developed with cycle-pressure ratios of 38 to 42 and base load firing temperatures of 2250° F. Cycle pressure ratios up to 44 are even now being contemplated.

These high-pressure ratio, high-temperature engines encounter far more severe duty and necessitate more careful material selection. Advanced design methods of controlling tip clearance of both the compressor and turbine sections are necessary. Mini computers and micro-processors are being applied to control the compressor and turbine outer-shell cooling to shrink or expand the casings to maintain close tip clearance and at the same time prevent tip rubbing. Air is being proposed to provide the shell cooling, either through impingement cooling or convection to accomplish active blade-tip control.

Close compressor blade-tip clearance is necessary to obtain high-compression efficiency at the elevated pressures and higher compression temperatures presently contemplated where the reduced blading size accentuates the fluid dynamics involved. Tip leakage and recirculation reduces compression efficiency and if not controlled the higher-cycle pressure ratios will not provide higher cycle efficiency and a corresponding lower specific-fuel consumption. Similarly, turbine blade-tip clearance is important to prevent gas-blade bypass, particularly in regard to the first-stage blading where a high pressure drop of 3 to 4 ratio is being realized through new techniques such as blunt-nosed "S"-wall nozzle vanes and a higher degree of reaction is transonic-rotating blades (40% reaction and 60% impulse).

Prototype jet engines being designed presently are to operate at about 2250° F. base load inlet temperature using air as the blade, disc and casing coolant. When considering 2400° to 2700° F. inlet temperatures for an industrial-gas generator as proposed in the present invention, there is a critical ducting area between the high-pressure turbine blading and the low-pressure blading which is subjected to a much higher temperature by about 350° F. over the jet engines. The main support struts pass through this ducting to tie the inner barrel, seals and rear bearing to the outer casing. This higher temperature environment requires special materials and cooling techniques to cope with the strength of materials and thermal expansion of these parts.

It is not practical to consider using steam as a disc and casing coolant in aircraft engines due to the weight restriction. Industrial gas turbines, on the other hand, do not have these weight restrictions and steam, which has been shown to be a far superior coolant than air with twice the specific heat and a lower viscosity, can be applied as a coolant, particularly when a combined cycle using a bottoming-steam turbine is contemplated.

Applicant's prior patents discussed above have dealt with the reheat gas/steam combined cycle thermodynamics and steam cooling of the gas turbine rotating blades and stationary vanes. A further object of the present invention is to provide steam cooling of the gas generator: including the compressor shell, compressor discs, turbine shell, inner barrel, support struts, and diffuser as well as the gas generator and power turbine blading. Another object of the present invention is to provide active control of the compressor and gas generator and power turbine blade-tip clearances during start up, running, and shut down using steam cooling.

As mentioned previously, considerable effort is presently being spent to develop industrial gas turbines which are to fire at 2600° F. and higher. Such effort is directed toward air cooling (transpiration) and water cooling the gas turbine to achieve such high firing temperatures. Steam cooling, however, is not presently being seriously considered. While there has been superficial investigation using steam as a coolant in the simple-cycle gas turbine, the reheat-gas turbine with steam cooling has not been considered for development in the United States. Japan is, however, developing a reheat-gas turbine for combined-cycle operation, but air is reported to be used as the coolant.

U.S. Pat. No. 4,272,953 and U.S. Ser. No. 224,496, filed Jan. 10, 1981, and U.S. Pat. No. 4,314,442, and U.S. Ser. No. 274,660, filed June 17, 1981, are herein incorporated by reference. Additionally, applicant has published numerous articles related to the reheat-gas turbine/steam-turbine-combined cycle in which are described the energy balance calculations and assumptions that indicate the advantages to be derived from steam cooling as used in the reheat gas turbine/steam turbine-combined cycle. Some of these publications are listed below and are numbered inasmuch as the data from these publications are referred to in a more detailed description of the invention given below.

1. I. G. Rice, "The Combined Reheat-Gas Turbine/-Steam-Turbine Cycle", Part 1-"A Critical Analysis of the Combined Reheat Gas Turbine/Steam Turbine Cycle" ASME Paper No. 79-GT-7, *ASME Journal of Engineering for Power*, January 1980.

2. I. G. Rice, "The Combined Reheat-Gas Turbine/-Steam-Turbine Cycle", Part II; "The LM 5000 Gas Generator Applied to the Combined Reheat Gas Turbine/Steam Turbine Cycle", ASME, Paper No. 79-GT-8, *ASME Journal of Engineering for Power*, January, 1980.

3. I. G. Rice, "Steam-Cooled Blading in a Combined Reheat-Gas-Turbine/Reheat-Steam-Turbine Cycle", Part I-"Performance Evaluation", ASME Paper No. 79-JPGC-GT-2, October, 1979.

4. I. G. Rice, "Steam-Cooled Blading in a Combined Reheat-Gas-Turbine/Reheat-Steam-Turbine Cycle", Part II-"Design Consideration", ASME Paper No. 79-JPGC-GT-3, October, 1979.

5. I. G. Rice, "The Reheat-Gas Turbine with Steam-Blade Cooling A means of increasing Reheat Pressure, Output and Combined-Cycle Efficiency", ASME Paper No. 81-GT-30, *ASME Journal of Engineering for Power*, March 1981.

6. I. G. Rice, "The Reheat Power Turbine With Steam Cooling-A Means of Increasing Reheat Temperature, Exhaust Temperature and Combined-Cycle Efficiency", ASME Paper No. 82-GT-134, April, 1982.

All of the above enumerated publications are also herein incorporated by reference.

SUMMARY OF THE INVENTION

In accordance with the present invention, the improvements in output and cycle efficiency possible when a reheat gas turbine containing a high-cycle pressure ratio, high-firing gas generator is combined with a steam turbine are achieved by comprehensive steam cooling of the gas generator and reheat power turbine. The steam coolant is extracted from the steam turbine. The heated coolant steam is either ejected into the gas stream passing through the reheat gas turbine (open-cycle-cooling) or is readmitted to the steam turbine at a lower pressure to be further expanded and condensed (closed cycle-cooling). A combination of open-cycle-cooling and closed-cycle cooling is utilized.

The lower temperatures, and thus the heat sink, provided by the bottoming-steam cycle has been shown previously to enhance and improve both the reheat gas turbine cycle and the steam cycle. For example, the open-cycle steam cooling of the gas generator vanes and blades as disclosed in applicant's U.S. Pat. No. 4,314,442 serves as a method of increasing both reheat pressure and reheat temperature. Another example of improving the combined cycle efficiency and output has been to reheat the steam by steam cooling the reheat combustor and at the same time shift this heat load from the heat-recovery boiler to the reheat combustor as set forth in applicant's U.S. Pat. No. 4,272,953 and thus improve the steam portion of the cycle.

In the present invention, the exit end of the power turbine is also cooled with extracted steam by the use of a closed-cycle steam cooling system wherein the exhaust hood and transition duct to the boiler are steam cooled. The steam cooling system of the present invention also contemplates the use of steam to control blade-tip clearnaces of the last stages of the high-pressure compressor, the gas generator turbine and the power turbine. Control of blade-tip clearance is vital to high performance and low specific fuel consumption. Close blade-tip control increases gas generator efficiency and output and protects against blade-tip rub. Steam cooling also increases the allowable stress levels of the various parts due to the resulting appreciable lower metal temperatures. A bit more freedom in the material selection is thus made possible. Additionally, there results a reduced disc low cycle fatigue by lowering the temperature differential between hub and rim, particularly during start up. A micro-processor mini-computer controls the amount of cooling steam flow to the compressor and turbine shells to control blade-tip clearance. Computer control also directs coolant steam flow to the support struts and inner barrel.

In another aspect of the present invention, the steam cooling cycle of the reheat gas turbine/steam turbine combined cycle is optimized in order to raise the gas turbine reheat inlet temperature from a previously proposed 2200° F. using steam cooling from a single steam reheat cycle to 2400° F. Such a gas turbine reheat inlet temperature is possible when the gas generator operates at a cycle pressure ratio of at least about 38 with a gas generator nominal turbine inlet temperature of about 2600° F. However, when the gas turbine reheat temperature is increased, the exhaust temperature also increases, which in turn throws the heat recovery out of optimization. Very little cycle efficiency gain results without again optimizing the heat recovery. It has been found that resorting to higher steam temperatures and providing a second steam reheat, heat recovery is again optimized and an attractive cycle efficiency gain results. By simultaneously satisfying the following three heat balance conditions for the double reheat steam turbine whereby the available heat in the exhaust is reduced by the amount of heat absorbed by the coolant, the steam temperatures can be determined for heat recovery optimization. The heat balance conditions are: (1) steam reproduction yields 2415 psia steam, (2) a first steam reheat flow at 604 psia with coolant flow split and (3) a second steam reheat flow at 140 psia with coolant flow split. Further, taking into consideration the difference in approach temperature to the saturated water in the economizer of the heat recovery boiler equal approximately to 50° F. to afford a reasonably constant temperature difference between the feed water being heated and the exhaust gas being cooled, heat recovery is optimized when the 2600° F./2400° F. reheat gas turbine is combined with a 1100°/1050°/850° F.-double-reheat steam turbine. With the higher exhaust temperatures contemplated by the present invention, it is even possible to consider a supercritical pressure of 3500 or 4500 psig production steam. This higher pressure, appears more appropriate for a double reheat steam turbine, though such a steam turbine would not be as conventional. It has been found that raising the reheat firing temperature from 2200° F. to 2400° F. increases the steam turbine output about 12%, the gas turbine output 8.9%, and the overall combined cycle output 9.9% when heat recovery and steam cooling are optimized. Additionally, by raising the reheat firing temperature to 2400° F., a net combined cycle efficiency of 58.78% can be achieved when heat recovery and steam cooling are optimized, thus achieving a gain of about 2.39% above that when the reheat inlet temperature is 2200° F.

The steam-cooled reheat gas turbine/double reheat steam turbine combined cycle of the present invention comprises a reheat gas turbine as disclosed in U.S. Pat. No. 4,272,953 and Applicant's pending application U.S. Ser. No. 224,496. Specifically, the compressor, gas generator turbine, reheat combustor, and power turbine are juxtaposed and axially aligned to allow linear gas flow throughout the entire reheat gas turbine. No intercooling is provided in between the gas compressor sections. The reheat combustor comprises a cylindrical shell in which is provided helical coils for the passage of steam from the high pressure steam turbine exhaust and which steam is reheated during passage through the reheat combustor. By placing the reheat steam coils adjacent the surface of the reheat combustor shell, the reheat combustor is cooled. If it is desired to superheat the steam formed in the heat recovery boiler in the reheat combustor, additional coils can be placed circumferentially around the interior of the reheat combustor chamber annularly spaced from the reheat steam coils. The fuel nozzles are positioned in the annular space between the reheat steam coils and the superheat steam coils about the circumference of the reheat combustor.

The steam bottoming cycle comprises a high pressure turbine, intermediate pressure turbine and low pressure turbine which are axially aligned along a single shaft. A crossover steam mixer positioned between the intermediate pressure turbine and low pressure turbine is provided to control the temperature of steam entering the low pressure turbine and provides a partial steam second reheat of steam from the intermediate pressure turbine. The crossover steam mixer mixes steam direct from the exhaust of the intermediate pressure turbine with double reheated coolant steam which has been extracted from the intermediate pressure turbine and heated during cooling of the reheat gas turbine. The high temperature double reheated steam has a very low moisture content thus reducing corrosion and erosion of the latter stages of the low pressure turbine.

The gas generator and power turbine are modified to provide open cycle steam cooling of the first and second stage gas generator vanes and rotating discs and blades and first stage power turbine vanes as well as the first, second, and third stage power turbine rotating discs and blades. An open-cycle-steam-cooling system is defined as a system whereby steam is extracted from the steam turbine, is optionally de-superheated, is subsequently fed to the turbine vanes or blades, is then used to convection and film-cool the blading and is finally ejected into the gas stream. The coolant is lost to the atmosphere in this cooling system and thus make-up water to the boiler feed is required. The modification required of the turbine blading to allow open cycle steam cooling are disclosed in U.S. Pat. No. 4,314,442 and Applicant's co-pending application U.S. Ser. No. 274,660, filed June 17, 1981. As disclosed therein, open cycle steam cooling of the turbine blading is provided by incorporating a leading edge steam distribution plenum in the interior of the blading and leading edge steam nozzles which direct steam from the interior steam plenum tangentially across the exterior surface of the blading whereby the external surface of the blading is covered with a thermal barrier of steam which insulates the blading against radiant and convection heating. The trailing edge portion of the blading may also include therein an internal coolant steam distribution plenum and a second steam nozzle placed at the trailing end of the blading whereby the flow of cooling steam from the internal coolant steam distribution plenum to the second steam nozzle provides convective cooling of the blading.

The advantages of open cycle steam cooling over the closed system include: film cooling insulates the blading against heat buildup and thus a higher gas-stream temperature is possible, the system is mechanically simplified, a higher exit-coolant temperature is possible, over firing is possible to heat the existing coolant to the turbine inlet temperature involved, there is half the pumping loss associated with the blade coolant, gas-generator work can be obtained by the coolant to raise the reheat pressure and reheat temperature, and lower thermal stresses are encountered.

The power turbine is further modified for closed cycle steam cooling. Specifically, steam is extracted from the steam turbine, used for cooling the second and third stage power turbine nozzle vanes, turbine shell, struts, inner barrel, and exhaust hood and is then readmitted to the steam turbine at a lower pressure to be further expanded and condensed.

The prospect of using steam in a closed cooling system has been studied in the past. U.S. Pat. No. 3,443,790, granted May 13, 1969, to Buckland discloses a steam cooled gas turbine employing a closed steam cooling system. As discussed in that patent, the advantages of the closed steam cooling system opposed to a closed water cooling system include; more reliability, more practicality, less or no deposits, less corrosion, less thermal stresses, less rotary instability, less likelihood of coolant leakage, and lower coolant working pressure (150–1200 psia vs. 4000 to 7000 psia). Although water is a much better coolant than steam and affords much higher heat transfer rates, and thus higher gas stream temperatures are potentially possible with water cooling, the challenges are much greater in developing such a system in view of the problems discussed immediately above.

As disclosed in the Buckland patent, steam cooling of the nozzle vanes is straightforward and rather simple. Steam is brought in from the outside of the turbine casing, is circulated through heat exchange passages inside the vanes and is then exited to the outside again. Steam cooling of the rotor and rotating blades is not as straightforward or as simple using a closed steam cooling cycle. Steam is fed through a steam packing seal to internal passages inside the rotor shaft. The steam then flows outwardly through holes in the various rotor discs to the individual blades where heat transfer takes place. The hot steam then passes inwardly back down the discs to the inside of the shaft where it is piped back through the packing to the outside again.

In the present invention, steam cooling of the rotor discs and rotating blades is achieved by the open cycle steam cooling system. The closed steam cooling system for the rotor has the following disadvantages over an open steam cooling cycle as used in the present invention. The closed steam cooling cycle is twice as complicated from a mechanical standpoint. The hot return steam heats up the shaft to a level that threatens the babbit journal and thrust bearings. There is twice the steam-pumping loss associated with getting the steam in and out. There are required twice as many seals between the rotor discs and blades. There is twice the overall pressure drop from inlet to outlet. The discs are subjected to greater differential temperature gradients and there is a limited-coolant-temperature rise which will limit the thermodynamic potential of the coolant cycle.

In accordance with the present invention, the larger physical sizes of the power turbine's second and third stage nozzle vanes make it practical to cast these parts with the required internal cooling passages and extended heat transfer surfaces for a closed steam cooling system. Likewise, the support struts, shell, inner barrel and ducts are large in size and thus make the closed system workable. The shell, struts and inner barrel are able to be fabricated from castings and rolled steel stock to provide the extended surfaces required for the heat transfer. Superheat tubing is employed to steam wall cool and shield the large exhaust hood and transition duct to the boiler.

Likewise, the closed cycle steam cooling system is applicable to the gas generator high pressure compressor as well as the gas generator turbine shell and struts. The outer shells of the compressor and gas generator turbine are provided with extended heat exchange surfaces to provide cooling. The outer shell of the compressor is provided with radial-support struts between the inner casing (which holds and positions the stator vanes and shroud strips that encircle the rotating blades) and the outer casing. Each radial-support strut contains extended surfaces and a flow control dam to create a vast thermal response to the coolant steam so that the compressor shell can be cooled or heated rapidly and at a faster rate than the compressor rotor during conditions of load charges, trips and startup. Signals from a mini-computer, micro-processor unit are optionally provided to control stream flow to the outer shell and compressor radial support struts to control the thermal expansion of the inner casing of the compressor and thus control blade-tip clearance.

A spherical compressor discharge combustor housing is provided and made up of a thin inner shell and a heavier outer shell and provided with steam cooling. The thin inner shell is in the form of a combustor housing bladder on the outer surface of which is spiralwound wire. The spiral windings add strength to the bladder, provide a much longer steam path for heat transfer, add heat transfer extender surface, provide back-up support against the outer shell and provide equal-steam-path spacing between the bladder and outer shell. The bladder is equipped with two or three small weep holes at the exit end to provide pressure equalization as a protective device against loss of steam pressure or malfunctioning of the steam control and to protect the bladder during startup. The small loss of steam is insignificant.

The gas-generator turbine shell surrounding and downstream of the first stage nozzle as well as the support struts and inner barrel and diffuser are all modified to provide steam cooling by the closed cycle cooling system whereby the heated steam is returned to a hot reheat steam header for readmission to the steam turbine. Ceramic thermal barriers are provided and bonded to metal parts which are exposed to the hot gases. Cooling steam is directed into isolated steam chambers which are formed in the turbine outer shell and inner barrel. Blade tip clearance can thus be controlled as in the high-pressure compressor.

The radial struts which carry the load of the gas generator rear bearing and internal seals and which provide passageways for feed and drain-lube oil lines must be treated carefully. These radial struts not only support the internal parts of the engines but also tie together the inner barrel and outer shells. The overall radial-thermal growth thus controls blade-tip clearance which is particularly important for high-expansion-ratio first stage rotating blades. A typically-applied method of controlling differential growth between the outer shell and the inner barrel is to attach the struts tangentially or semi-tangentially to the inner barrel. The struts, when expanded due to temperature increases, rotate the cool inner barrel and thus maintain axial alignment of the outer shell to the barrels. This procedure greatly reduces thermal cracks between the struts and shells.

In accordance with the present invention, the struts are isolated or shielded from the hot gas steam by surrounding or cladding each strut with a series of small-diameter stainless steel steam tubes which are arranged parallel with the main-gas flow. The strut is further provided with inner-steam holes, each of which has riflings broached therein. The riflings spin the steam to provide a much longer flow path, provide extended surface area for heat transfer, and provide a way to create a steam turbulence to increase heat transfer.

The mentioned objectives of the present invention and other objectives will become apparent upon a more detailed description of the steam cooling cycle and can be ascertained by the detailed description of the drawings.

BRIEF DESCRIPTION OF THE DRAWINGS

FIG. 3 is a cross-section of the steam-cooled gas generator illustrating the area between the high pressure compressor and gas generator turbine exit and additionally illustrating hot gas and steam coolant paths.

FIG. 4 is a cross-section of the compressor outer shell taken generally along a plane passing through line 4—4 of FIG. 3.

FIG. 5 is an enlarged view of FIG. 3 illustrating the radial-support hoop struts contained in the high-pressure compressor outer shell for effective blade-tip control using steam as the coolant and air as a thermal barrier.

FIG. 5a is an enlarged view of FIG. 3 illustrating the radial-support struts contained in the high-pressure compressor outer shell for effective blade-tip control using steam as the coolant and steam as a thermal barrier.

FIG. 6 is a transverse cross-section of the radial-support strut taken generally along a plane passing through line 6—6 of FIG. 5.

FIG. 7 is a perspective view of the compressor-discharge combustor housing bladder.

FIG. 8 is a transverse cross-section of the combustor housing bladder.

FIG. 9 is a transverse cross-section of the gas generator turbine outer casing taken generally along a plane passing through line 9—9 of FIG. 3.

FIG. 10 is a schematic-electrical control diagram for blade-tip clearance control using steam as the coolant.

FIG. 11 is an enlarged cross-section of the steam-cooled gas-generator turbine further illustrating the hot gas and coolant steam flow paths.

FIG. 12 is a transverse cross-section of the steam-cooled strut showing the outer-steam shield and inner-steam riflings taken generally along a plane passing through line 12—12 of FIG. 11.

FIG. 13 is an enlarged fragmented perspective view of the inner-steam rifling tubes of the steam-cooled strut.

DETAILED DESCRIPTION OF THE INVENTION

COMBINED-CYCLE ARRANGEMENT

Figure 1:
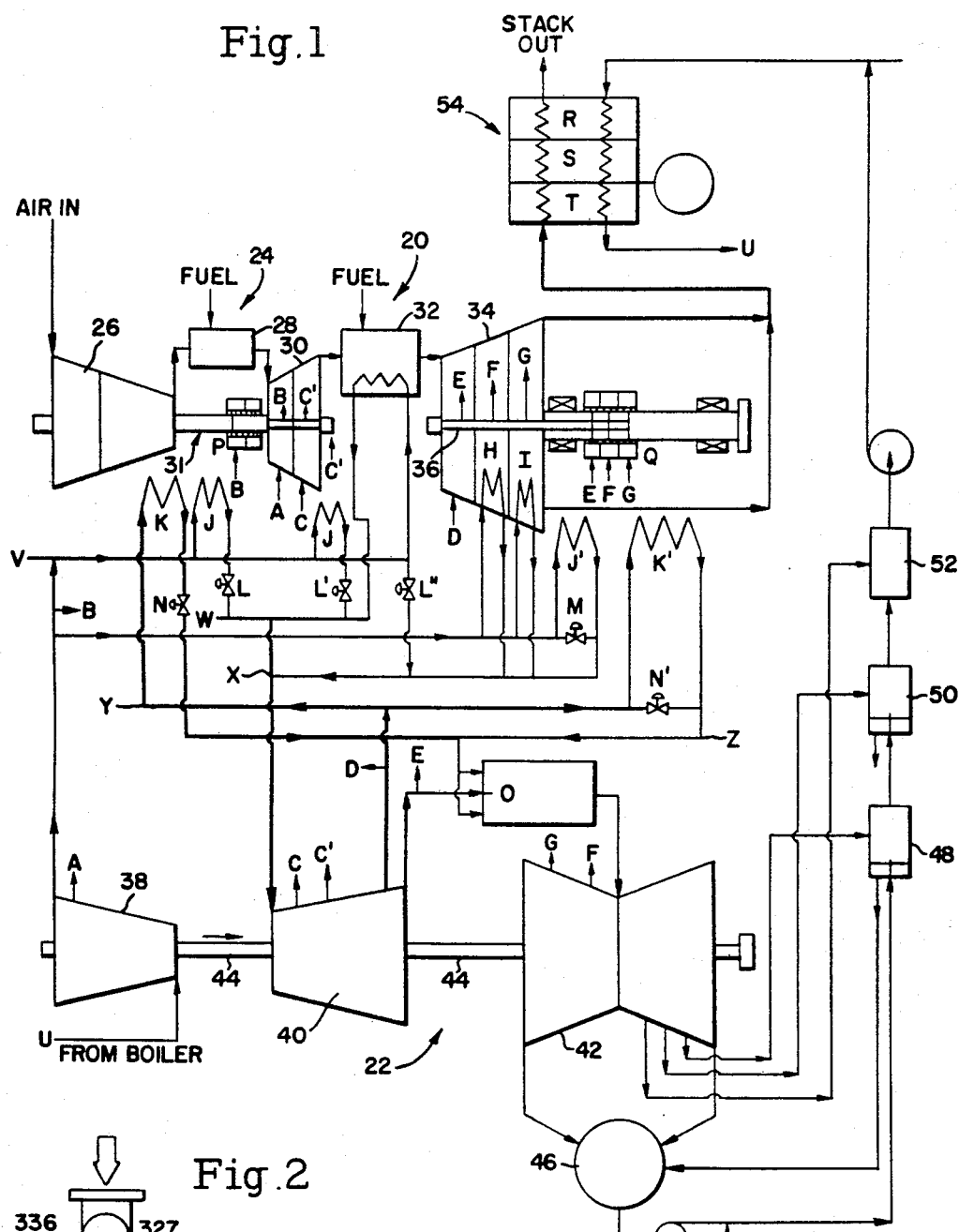
FIG. 1 is a schematic diagram of the steam cooling system for the reheat gas turbine/steam turbine combined cycle of the present invention.

The reheat gas turbine/double reheat steam turbine combined cycle with steam cooling is illustrated in FIG. 1 in which the reheat gas turbine is generally indicated by reference numeral 20 and the double reheat steam turbine bottoming cycle indicated by reference numeral 22. Reheat gas turbine 20 comprises a gas generator 24 which includes compressor 26, fuel combustor 28 and gas generator turbine 30 which are axially arranged along shaft 31. Juxtaposed and axially aligned with gas generator 24 is reheat combustor 32 and power turbine 34. Ambient air entering compressor 26 is compressed and passed to combustor 28 where the fuel is ignited and the gas expanded in gas generator turbine 30, thus causing rotation of shaft 31 and operation of compressor 26. Exhaust gas leaving gas generator turbine 30 is reheated in reheat combustor 32 and again expanded in power turbine 34, thus causing the rotation of shaft 36 which may be associated with an electric generator and the like. Gas flow through compressor 26, combustor 28, gas generator turbine 30, reheat combustor 32 and power turbine 34 is substantially linear throughout, thus greatly eliminating pressure losses. Additionally, there is no intercooling after compression, thus minimizing heat loss and providing an important reason the reheat gas turbine/steam turbine combined cycle is an attractive method for producing electrical power, especially when second generation gas generators of high cycle pressure ratios and high initial firing temperatures are utilized.

The steam bottoming cycle 22 comprises high pressure steam turbine 38, intermediate pressure steam turbine 40, and double flow, low pressure steam turbine 42, all of which are aligned along a single turbine shaft 44. Shaft 44 can be associated with a separate electric generator. Exhaust steam from low pressure steam turbine 42 is liquified in condenser 46 and, along with water make-up, fed to boiler feed water heater 48. Low pressure steam is used to heat the boiler feed water in each of boiler feed water heaters 48, 50, and 52. Steam entering high pressure steam turbine 38 is formed in heat recovery boiler 54 in which boiler feed water from heater 52 is heated, vaporized and superheated in heat recovery boiler 54 from the exhaust gas of power turbine 34.

The steam cooling cycle is also illustrated in FIG. 1 in which reheat gas turbine 20 is cooled by a combination of open cycle steam cooling and closed cycle steam cooling. The open cycle steam cooling is illustrated by labeling the preferred steam extraction points, steam entry and steam exit with the same reference letter. The open cycle steam cooling system is used for first stage (high pressure) gas generator vanes A, first stage gas generator blades B, second stage (low pressure) gas generator vanes C and blades C', first stage power turbine vanes D, first, second and third stage power turbine blades E, F, and G, respectively. The closed cycle steam cooling system is appropriate for the second stage power turbine vanes H, third stage power turbine vanes I, gas generator shell and struts J, power turbine shell and struts J', the gas generator high pressure compressor K, and the power turbine exhaust hood and duct K'. Additionally, the steam cooling system comprises reheat combustor pressure regulating valves L, L', and L", power turbine vanes, shell and strut pressure regulating valve M, gas generator and power turbine exhaust hood and duct pressure relief valves N and N'. A cross over steam mixer O mixes exhaust steam from intermediate pressure steam turbine 40 and double reheated coolant steam to provide the proper steam temperature for the steam entering low pressure steam turbine 42. The gas generator shaft packing and power turbine shaft packing are represented by P and Q, respectively. Heat recovery boiler comprises economizer R, evaporator S, and superheater T. The superheater may optionally be incorporated in reheat combustor 32.

In a preferred closed cycle cooling system, superheated steam from superheating T or reheat combustor 32 is dispersed to high pressure steam turbine 38 via steam header U at 2415 psia. Cold exhaust steam from steam turbine 38 is dispersed via steam header V at 604 psia. Steam header V splits the 604 psia steam flow to steam cool power turbine vanes H and I, power turbine shell and struts J' and gas generator shell and struts J as well as reheat combustor 32. Steam headers W and X receive 545 psia reheated steam from the gas generator and reheat combustor and power turbine, respectively, for discharge into intermediate pressure steam turbine 40. Expanded and cooled reheat steam from steam turbine 40 at 140 psia is split by steam header Y to cool compressor area K and the power turbine exhaust hood and duct K'. The double reheated steam at 123 psia is charged to steam mixer O via return header Z. The hot return steam provides a partial double reheat for steam exhausted from steam turbine 40 and charged to steam mixer O. The double reheated steam is charged to low pressure steam turbine 42.

The preferred steam pressures and temperatures at the cooling points for both open cycle and closed cycle cooling are described in more detail below under the respective headings of individual reheat gas turbine components.

A reheat gas turbine/double reheat steam turbine combined cycle with the steam cooling that is particularly preferred is one in which the compressor provides a cycle pressure ratio of at least about 38-40 and an initial firing temperature of 2600° F. in which the reheat firing temperature is 2400° F. and and the steam cooling cycle is optimized to control the steam temperature. The steam cooling cycle can be optimized and the 2400° F. reheat firing temperature met when a 2600°/2400° F. reheat gas turbine is combined with a 1100°/1050°/850° F. double reheat steam turbine. Table I taken from applicant's publication No. 6 is a heat balance comparison between three reheat gas turbine/steam turbine combined cycles. A 2600°/2200° F. reheat gas turbine without power turbine exit cooling combined with a 2415 psia 1000°/1000° F./reheat steam turbine as a base case is compared first with a 2600°/2400° F. reheat gas turbine combined with a 2415 psia 1000°/1000°/925° F. double reheat steam turbine with power turbine exit cooling and, second, with a 2600°/2400° F. reheat gas turbine combined with a 2415 psia 1100°/1050°/850° F. double reheat steam turbine with power turbine exit cooling. In all cases, steam cooling of the gas generator shell and struts and the gas generator high pressure compressor is not considered. From Table I, it can be seen that very little cycle efficiency gain is obtained with the 2400° F. reheat turbine inlet temperature when the heat recovery is thrown out of optimization (first comparison). Noting Item 8 of Table I, a gain of only 0.44% is achieved even though the second steam turbine reheat temperature of the first comparison is 925° F. When heat recovery is optimized with the 2415 psia, 1100°/1050°/850° F. double reheat steam turbine, the cycle efficiency gain is shown to be an advantageous 2.39%. The gross work output increases by 11.2% for the 2415 pisa 1000°/1050°/925° F. steam turbine and 9.8% for the 2415 psia 1100°/1050°/850° F. double reheat steam turbine. The extra efficiency associated with the latter is obtained at a slight loss in cycle-work output. The latter case is preferred where cycle efficiency is considered primary. The increase in cycle efficiency is brought about by two basic reasons. The gas turbine reheat fuel required to heat the first steam reheat is cut in half with 50% of the heat being supplied by the cooling steam from the high pressure steam turbine, Item 4C. The condenser loss secondly, is appreciably reduced as can be seen in Item 5C.

Figure 15:
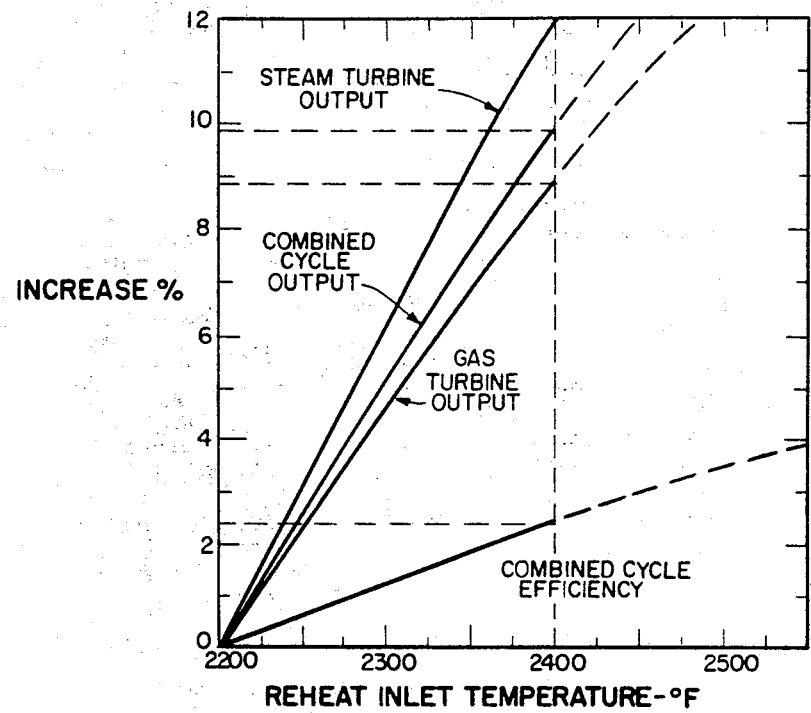
FIG. 15 is a plot of the increase in combined-cycle output, gas-turbine output, steam turbine output, and combined-cycle efficiency vs. gas-turbine reheat-inlet temperature.

A graph of increase in output and cycle efficiency vs. the reheat inlet temperature is given in FIG. 15. In the preferred cycle, the net gain in steam turbine power is 12.02%, 8.9% for the gas turbine and 9.9% for the overall cycle.

TABLE I

| | CYCLE COMPARISON RHGT - CC 40 CPR | | |
|---|---|---|---|
| | GT 2600/2200° F. ST 2415 PSIA 1000/1000° F. | GT 2600/2400° F. ST 2415 PSIA 1000/1000°/925° F. | GT 2600/2400° F. ST 2415 PSIA 1100/1050/850° F. |
| I GT CYCLE WORK - BTU/LB AIR | | | |
| A. AIR CYCLE | 272.73 | 295.63 | 295.63 |
| B. COOLING STEAM | 34.90 | 39.59 | 39.59 |
| C. Δ POWER FOR Δ FUEL | 1.92 | 1.92 | 1.92 |
| D. SUB TOTAL | 309.55 | 337.14 | 337.14 |
| E. % GAIN (GROSS) | BASE | 8.91 | 8.91 |
| II ST CYCLE WORK - BTU/LB AIR | | | |
| A. ST (CONDENSING) | 108.76 | 130.11 | 121.91 |
| B. ST (COOLING - TOPPING) | 18.17 | 18.17 | 20.29 |
| C. SUB TOTAL | 126.93 | 148.28 | 142.20 |
| D. % INCREASE (GROSS) | BASE | 16.82 | 12.03 |
| III TOTAL WORK - BTU/LB AIR | | | |
| A. WORK | 436.48 | 485.42 | 479.34 |
| B. % INCREASE | BASE | 11.2 | 9.8 |
| IV CYCLE INPUT - BTU/LB AIR | | | |
| A. GT AIR CYCLE | 601.27 | 667.28 | 667.28 |

TABLE I-continued

| CYCLE COMPARISON RHGT - CC 40 CPR | GT 2600/2200° F. ST 2415 PSIA 1000/1000° F. | GT 2600/2400° F. ST 2415 PSIA 1000/1000/925° F. | GT 2600/2400° F. ST 2415 PSIA 1100/1050/850° F. |
|---|---|---|---|
| B. GT RH & COOLING | 95.58 | 106.28 | 106.28 |
| C. REHEAT | 39.58 | 42.89 | 17.52 |
| D. FW Δ FUEL | 1.41 | 1.41 | 1.41 |
| E. Δ FUEL FOR Δ WORK | 1.92 | 1.92 | 1.92 |
| F. BOILER-FEED PUMP | 2.86 | 3.04 | 2.86 |
| G. TOTAL INPUT | 742.89 | 822.82 | 797.27 |
| H. % INCREASE | BASE | 10.8 | 7.32 |
| V LOSSES - BTU/LB AIR | | | |
| A. STACK GAS (LHV) | 61.38 | 61.63 | 61.63 |
| B. COOLING STEAM | 94.56 | 94.56 | 94.56 |
| C. CONDENSER | 145.36 | 175.88 | 156.86 |
| D. BOILER | 4.22 | 4.68 | 4.68 |
| E. SUB TOTAL | 305.52 | 336.75 | 317.73 |
| F. % INCREASE | BASE | 10.2 | 4.00 |
| VI TOTAL CYCLE OUTPUT - BTU/LB AIR | | | |
| A. OUTPUT | 742.00 | 822.17 | 797.07 |
| B. % INCREASE | BASE | 10.8 | 7.42 |
| VII GROSS CYCLE EFF. - % | 58.58 | 58.84 | 59.98 |
| VIII NET CYCLE EFF. - % | 57.41 | 57.66 | 58.78 |
| % GAIN | BASE | 0.44 | 2.39 |
| IX STEAM GENERATION - LB/LB AIR | .2597 | .2764 | .2598 |

POWER TURBINE

The power turbine of the combined cycle of the present invention is modified for steam cooling. The closed-cycle steam cooling system for the power turbine can best be understood by referring to FIGS. 1 and 14. Generally, it is mechanically practical to feed steam to the second and third stationary vanes H and I of power turbine 34. Part of the 604 psi steam from cold steam header V can be used as the vane coolant and as a coolant for the turbine struts, casing, and internal drum, which heat exchange areas are designated as J' in FIG. 1. The heat absorbed by the power turbine coolant steam does not require reheat combustor fuel for temperature optimization and thus a direct reduction in gas turbine reheat fuel takes place as indicated in Table 1. The reheated coolant steam is directed to intermediate pressure steam turbine 40 by a return steam header X.

The closed steam cooling system is also proposed to cool the large internal areas of the exhaust hood and transition duct of power turbine 34. This heat exchange area is designated by reference number K'. Steam from the intermediate pressure turbine is extracted at 140 psia and heated by the exhaust hood and duct before being mixed with the main-steam flow in the crossover steam mixer O. Preferably, the hot 1100° F. return steam comprises 46% of the flow available and at 123 psia is mixed with the 120 psia exit steam from intermediate pressure turbine 40. The mixture at 850° F. enters double-flow low pressure turbine 42 to be expanded to two inches Hg absolute. The double reheated steam temperature is an important feature of the present invention since it enables the moisture content of the steam in low pressure turbine 42 to be greatly reduced. 120 psi steam expanding from 650° F. to two inches Hg absolute has an endpoint moisture content of 7.4%. However, when the 120 psi steam admission temperature is raised to 850° F. as in the present invention, the moisture content is greatly reduced to a value of 1.1%. The moisture content will be 0 if the steam is heated to 925° F. A moisture content of 7.4% creates extra maintenance as is well known as the leading edges of the last stages of the steam turbine are typically eroded away by the water droplets that form and are not separated. Corrosion of the last stages is a source of blade failures as is well known.

Figure 14:
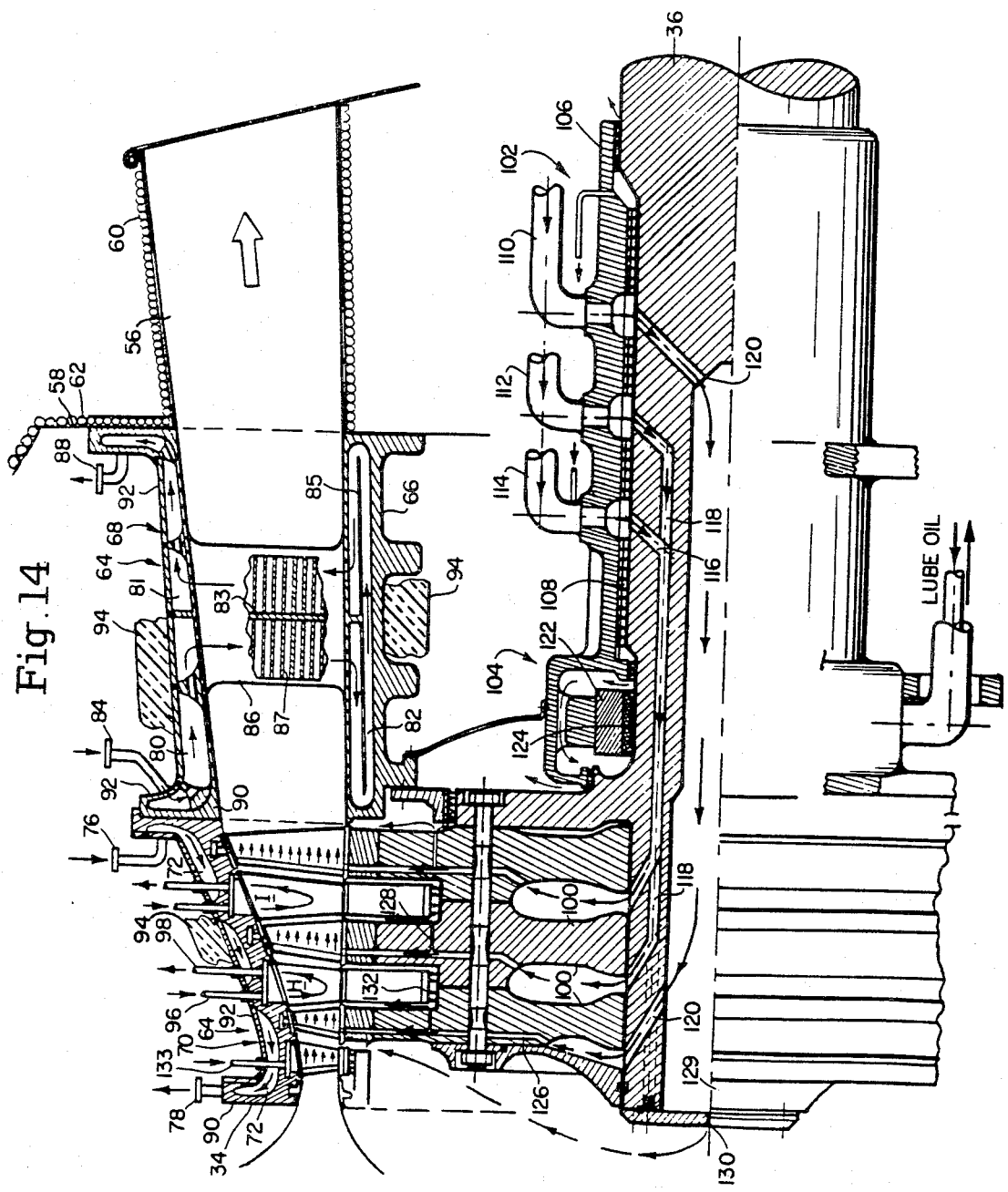
FIG. 14 is a partial cross-section of the steam-cooled power turbine showing open-cycle steam cooling and closed-steam cooling steam flow paths.

Referring more specifically to FIG. 14, reheat gas enters power turbine 34 at 2400° F. and exits to the exhaust diffuser-plenum (transition duct) 56 at 1410° F. where the gas is further cooled to 1362° F. by steam wall cooling exhaust plenum 56 and exhaust hood casing 58 with 140 psia steam. The steam wall cooling of diffuser-plenum 56 and exhaust hood 58 is achieved by lining these components with heat exchange tubing 60 and 62, respectively, through which the 140 psi steam passes.

Outer turbine shell 64 and inner barrel 66 are cooled by the 604 psia cold steam. The outer shell 64, comprised of diffuser outer shell 68 and forward shell 70, and inner barrel 66 are each cooled with independent circuits whereby the steam flow can be increased or decreased to provide blade-tip clearance control. Forward shell 70 which confines the turbine blading is provided with a plurality of steam chambers 72, each adjacent one of the first, second and third stage turbine blading. The heat exchange steam chambers 72 are supplied with 604 psia steam from inlet header 76, the low pressure end and the reheated steam leaves of forward shell 70 via exit header 78 at the higher pressure end of power turbine 34. Thus, steam flow is in a direction opposite to the gas flow. The diffuser outer shell 68 is provided with steam chambers 80 and 81 and inner barrel 66 is provided with steam chamber 82. Coolant 604 psia steam enters steam chamber 80 via inlet header 84. The coolant steam passes in the direction of gas flow from steam chamber 80 through heat exchange surfaces in the leading edge portion of strut 86 to steam chamber 82 in inner barrel 66, back through the trailing edge portion of strut 86 to steam chamber 81 and is exhausted via exit steam header 88. Strut 86 which connects inner barrel 66 with diffuser outer shell 68 is provided with a vertical flow control dam 83 which divides steam chambers 80 and 81 and separates strut 86 into the leading and trailing edge portions. Baffel 85 in steam chamber 82 insures steam circulation to cool inner barrel 66 and provides for steam flow from the leading portion of strut 86 to the trailing edge portion thereof. When more steam is allowed to flow through outer shell 64 and support struts 86, the shell diameter will decrease due to a reduced metal temperature. Less strut and shell temperature expansion will be present. The strut leading edge is cooled more than the trailing edges due to the cooler steam temperature, to cause forward shell tilting. A micro-processor control system can be used to control steam flow through the various steam chambers.

The outer shell 64 and inner barrel 66 can be fabricated from steel castings and rolled-steel stock. Extended surface cooling fins (not shown) parallel with the steam flow can be provided as part of the castings. For example, an overlay of rolled steel plates 92 welded to castings 90 form the pressurized steam chambers 72, 80 and 81 for the coolant steam flow in forward shell 70 and diffuser shell 68, respectively. The shells can be stress relieved in a soaking furnace before being machined. Struts 86 can also be made of cast steel to provide internal extended surface-cooling fins (not shown) and inner steam flow restriction dams 87. The outer shell 64 and inner barrel 66 can be insulated with insulation layer 94 to prevent excessive radiation-heat loss.

The second and third stage stationary nozzle vanes H and I are also cooled by the 604 psia cold steam in a closed cycle under separate control. Steam is brought to the nozzle vanes via inlet steam header 96, passed through cooling passages in the stationary vanes (see arrows) and then exits via exit steam passage 98 to steam return header X. About a 40 psi pressure drop is available in the vanes to accomplish the described cooling which allows appreciable flexibility in the specific design of the cooling passages.

Steam for cooling discs 100 and the first, second, and third stage rotating blades represented by E, F and G, respectively, in an open cycle steam cooling system is brought in through a steam seal 102 which is located between the two power turbine journals, only one of which is shown and indicated by reference numeral 104. Steam seal 102 comprises a steam seal upper cover 106 which is positioned atop of rotating shaft 36. A labrinth seal packing 108, interposed between steam seal cover 106 and shaft 36 provides passage for steam entering steam seal cover 106 through high pressure steam line 110, intermediate pressure steam line 112 and low pressure steam line 114 to steam lines 116, 118, and 120 drilled through shaft 36. Steam at 140 psia, 85 psia, and 35 psia provided through steam lines 120, 118 and 116, respectively, is employed to cool the first, second and third stage rotating blades E, F and G, respectively (see FIG. 1), whereby an additional pressure to the rotating blades of some 20 psi above the gas stream total pressure is assured. The temperature of the de-superheated steam will be no more than 360° F. for the 140 psi steam that flows through the center of shaft 36 through steam line 120. Cooler steam at 320° F. and 260° F. flow through divided passages 118 and 116 in shaft 36 under journal 104. These latter cooler temperatures will not threaten the journal bearing 122 by melting the babbit 124.

Steam from the steam lines 120, 118 and 116 are directed to the first stage rotating blades E, F and G, respectively, through steam passages 126 drilled through the respective individual discs 100 and the base of each rotating blade. Internal steam plenums (not shown) in the rotating blades receive the steam which is then passed through steam nozzles which direct the steam tangentially across the external surface of each rotating blade. Convective cooling of the discs 100 is achieved by steam passage through individual steam lines 126 as well as by external film cooling as steam passes from steam lines 116, 118 and 120 and contacts the external surfaces of discs 100 before entering steam lines 126. Additionally, narrow steam lines 128 extending from steam lines 126 transversely across discs 100 provide further steam flow against the external surfaces of the discs and base of the rotating blades. Another narrow steam line 129 is provided in communication with steam line 120 and orifice 130 within shaft 36 to provide further film and convective steam cooling of the discs 100. Steam seals 132 are provided for the discs.

The stationary first stage nozzle vanes D are cooled and blanketed by 169 psia steam in an open cycle because the 2400° F. gas reheat inlet temperature is deemed to be excessive by 200° F. to allow a closed system. Cooling steam for first stage nozzle vanes D enters through steam line 133 and like the cooling steam for the rotating blades is lost to the stack.

There is considerable design flexibility present regarding cooling steam available and pressure drops required for actual heat loads found necessary to cool the power turbine components. For example, additional cooling coils can be added to the exhaust duct 56 before the boiler to accomplish required steam heating if the presently described cooling capacity is insufficient. Additionally, steam flows can also be increased if more cooling capacity is needed. It is not expected that the overall-cycle efficiency will be affected.

GAS GENERATOR

Referring to FIG. 1, the heat transfer surfaces to be presently discussed are designated by reference letters J and K. The cold steam from steam header V at 604 psia is introduced to the gas generator turbine shell for heat exchange J whereas the first reheated steam at about 140 psia from steam header Y is fed to the compressor shell for heat exchange K.

COMPRESSOR SHAFT, DISC AND CASING COOLING

Also referring to FIG. 3, the high pressure compressor rotor drum 135 is typically made out of a titanium alloy (TiAl$_6$V$_4$) which has a coefficient of thermal expansion of $5.0 \times 10^{-6}$ in/in°F. and a low conductivity rate of 50 BTU in/(ft$^2$hr°F.). These expansion and conductivity values have to be matched by the outer casing material characteristics during start-up, running, load changes, stopping, full-load trips and load shedding. Typically, the high pressure end of compressor 26 will have compressor discs 136 made out of a nickel-base material to withstand the high 1000°–1100° F. temperature environment. The thermal expansion of such materials can range from 8.0 to $9.8 \times 10^{-6}$ in/in°F. and the thermal conductivity from 135 to 165 BTU in/(ft$^2$hr°F.). These values are considerably higher than those of the titanium alloy forward drum 135 and therefore careful matching of the outer casing material and steam cooling is necessary to control blade-tip clearance.

Extracted steam which has been de-superheated under controlled conditions is used to cool outer compressor casing 138 and radial hoop support struts 140 to the inner casing 142. A plurality of radial support struts 140 are spaced along the length of compressor casing 138. Each strut 140 extends circumferentially around the cylindrical surface of casing 138. Inner casing 142 holds and positions the stator vanes 144 and the shroud strips 146 (see FIG. 5 or 5a) that encircle the rotating blades 148. A two point control system may be used as shown in FIG. 3 where steam at 140 psia and 355° F. is admitted at two points, station 1 (pipe 150) and station 2 (pipe 152). The heated steam exits at about 125 psia and 600° F. at station 3 (pipe 154) and is readmitted to the steam turbine after being further heated to 1110° F. in the power turbine exhaust area K'. Signals from a minicomputer micro-processor unit 156 (FIG. 10) control the two pressure control valves 158 and 160. Inputs to the micro-processor are all the pertinent variables such as engine speed (low pressure compressor, high pressure compressor and power turbine), ambient temperature, gas generator firing temperature, compressor-discharge temperature, output, reheat turbine inlet temperature, shell and space temperatures, etc. Variables are fed to the mini-computer as required and programmed.

The amount of coolant steam that is admitted at stations 1 and 2 control the expansion of outer casing 138 and compressor radial support struts 140. Referring now to FIGS. 4, 5, 5a, and 6, the radial support struts 140 contain hollow, elongated steam chambers 162 adjacent to inner casing 142 and extending radially from the longitudinal axis of gas flow through compressor 26. Steam flow to each chamber 162 is provided through either station 1 or 2 via the hollow cylindrical steam chamber 164 formed as part of compressor outer casing 138. Steam flow through chamber 164 is concurrent to the gas flow through compressor 26. Steam chamber 164 is provided with heat exchange fins 165 to increase heat exchange (see FIG. 4). Steam chamber 164 in outer compressor casing 138 is annularly spaced from the inner compressor casing 142 by means of inner chamber 166.

Radial support struts 140 each contain extended surfaces 168 and a flow control dam 170 to create a fast thermal response so that the compressor casings 138 and 142 can be cooled or heated rapidly and at a faster rate than the compressor rotor 134 during conditions of load charges, trips and start-up. Flow control dam 170 extends longitudinally through radial support steam chamber 162 to provide adequate coolant steam circulation through the radial support strut 140. An orifice 172 is provided in flow control dam 170 adjacent the outer surface of the radial support strut 140 to further provide coolant steam circulation through the outer portions of chamber 162.

The two inner chambers 166 between stations 1 and 2 in FIG. 3 are filled with compressor air through orifices 174 positioned through inner compressor casing 142. The temperatures corresponding to the pressure at these portions of the compressor are much lower than the compressor discharge temperature and thus the compressor air provides a modest thermal barrier between the inner compressor casing 142 that holds the stator vanes 144 and the outer-cylindrical steam chamber 164 formed in outer compressor casing 138.

The two forward inner chambers 166 between stations 2 and 3 contain bleed steam fed through orifices 176 from radial support strut steam chamber 162. This steam is at a much lower temperature than the corresponding compressed air at this point in the compressor (500° F. vs 900°–1100° F.). A thermal barrier is thus established by this bleed steam wherein the steam pressure drop of the radial struts 140 provides the pressure differential for bleed flow. Compressor inner casing 142 is subjected to a pressure which is the difference between the air pressure and steam pressure, 550 psia minus 130 psia steam in inner chamber 166, providing a pressure of 420 psia (see FIG. 5a).

When the cooling steam flow is increased to increase cooling of the radial struts 140, coolant steam flow through the two inner chambers 166 between stations 2 and 3 increases due to the increase pressure drop across the radial struts to provide additional cooling to compressor inner casing 142. Thus, the radius of the inner cylinder wall of the compressor is reduced.

Cylinder-hoop stress and strain are important. Stress is calculated by the following two formulas for thin-shelled vessels:

$$\delta_l = Pr/2t \qquad (1)$$

$$\delta_t = Pr/t \qquad (2)$$

where $\delta_l$ is the longitudinal stress, $\delta_t$ is the tangential stress, P is the pressure, r is the radius and t is shell thickness. Formula (I) can also be used to calculated the stress in a thin-walled sphere. Strain is calculated by applying Hooke's law where stress is proportional to strain and this ratio is equal to the modulus of elasticity.

The allowable stress for industrial gas turbines at the elevated temperature of 1000°–1100° F. is about 20,000 lbs/in$^2$ for superalloy steels for adequate creep, safety and stress-rupture protection. The allowable stress increases to about 40,000 lbs/in$^2$ when the inner casing 142 is cooled to 700° F. with steam. The pressure-containing cylinder 142, therefore, can be fabricated out of much thinner material to give a much faster response time. As an example, the inner casing of a three foot diameter shell, when considering hoop stiffeners, can be decreased from 0.30 in. to 0.15 in. for a 40 cycle pressure ratio turbine. Also, the material can be of a different (lower cost) alloy with thermal expansion and conductivity characteristics to properly match the rotor discs and blades.

The stationary shrouds 146 that surround the rotating blades 148 can be cladded with a ceramic-thermal barrier 178 as shown in FIGS. 5 and 5a. This thermal barrier will reduce the heat transfer to radial strut 140 and make the strut more responsive to the steam coolant. The barrier coating 178 also provides a good running surface for the blade tips to keep the clearance as small as possible but yet prevent rubbing. Coating or cladding 178 also provides a rubbing surface that will prevent galling and severe damage in case of a slight rub.

The coolant steam-flow direction is from the low-compressor pressure area to the high pressure compressor discharge. This procedure matches and balances the temperature rise of both the steam and the compressed air. Thus, as discussed above, coolant steam entering outer casing 138 at station 1 at a temperature of 355° F. leaves station 3 at a temperature of about 600° F.

Insulation 180 can be applied over outer compressor casing 138 to prevent radiation and convection-heat loss. A low heat loss establishes a stable outer metal environment that is not subject to ambient air temperature changes.

COMPRESSOR DISCHARGE/COMBUSTOR HOUSING

The spherical compressor discharge/combustor housing 28 which contains the 38–42 atmospheres of pressure at 1000°–1100° F. can be made of a thin inner shell 182 and a heavier outer shell 184 as shown in FIG.

3. The shape of combustor housing 28 is spherical as shown to equalize growth, stresses, and pressure distortion. The same general principles as used for the compressor outer casing are applied to control growth and thus tip clearance of the compressor last stages and the first-stage gas generator turbine blades. A thin stainless steel inner shell of perhaps 0.030 inch thick is used to provide the inner combustor housing 182 as a thermal barrier.

Reference is further made to FIGS. 7 and 8 which show the thin inner stainless-steel bladder 182. Sprial wound on the outer surface of combustor housing bladder 182 is approximately 0.050 inch stainless-steel rectangular shaped wire 186 of the same material as the bladder. Wire 186 is either continuously pressure welded to the outer surface of bladder 182 or is high temperature braised to the outer surface. The bladder assembly is installed prior to the welding of the support struts 188. The bladder can be sealed at all points by welding. Spiral windngs 186 add strength to bladder 182, provide a much longer steam path for heat transfer, add heat transfer extender surface, provide back-up support against outer shell 184 and provide equal-steam path spacing between bladder 182 and outer combustor shell 184. Bladder 182 is equipped with two or three small weep holes 188 about 0.030 inch in diameter at the exit end to provide pressure equalization as a protective device against loss of steam pressure or malfunctioning of the steam control and to protect bladder 182 during start-up. The small loss in steam will be insignificant. Additionally, bladder 182 is provided with a plurality of fuel nozzle holes 190 spaced circumferentially around combustor housing bladder 182 and a plurality of strut openings 194 also spaced circumferentially around the bladder.

To cool the combustor housing 28, steam at a pressure of about 570 psia from the cold steam coolant header V enters at Station 4 (pipe 196) at about 500° F. and is directed between the combustor housing bladder 182 and the outer combustor shell 184. The coolant steam heats to about 800° F. at exit Station 5 (pipe 198). At a steam pressure of about 570 psia for a 40 cycle pressure ratio reheat gas turbine, bladder 182 would be subjected to about an 18 psi pressure differential. The outer thick spherical combustor housing 184 retains the 570 psia pressure at a substantially lower temperature than would be experienced with the direct contact of the 1100° F. compressor air. The thermal expansion of outer combustor housing 184 is controlled by the steam flow as regulated by the micro-processor 156. The steam at 560 psia is discharged to the steam turbine reheat line.

The coolant steam-flow direction is from the compressor discharge to gas generator turbine nozzle to help balance the temperatures encountered.

Stress formula (I) is applicable for a thin-shelled sphere. The allowable spherical housing stress, $\delta$, when considering an industrial gas turbine, can be increased from about 20,000 psi to 40,000 psi when the outer shell 184 is steam cooled and the metal temperature is lowered from about 1000° F. (average) to 700° F. (average). The outer shell thickness can therefore be cut in half. The shell thickness for a four foot diameter sphere can be reduced from about 0.36 inch to about 0.18 inch. There will be far less thermal lag and a faster response to the steam cooling will be accomplished.

Outer combustor housing shell 184 is preferably covered with insulation 200 to prevent radiation and convection heat loss, which in the case of an aircraft turbine is not possible because expansion control is accomplished by air sweeping the outer surface.

Figure 19:
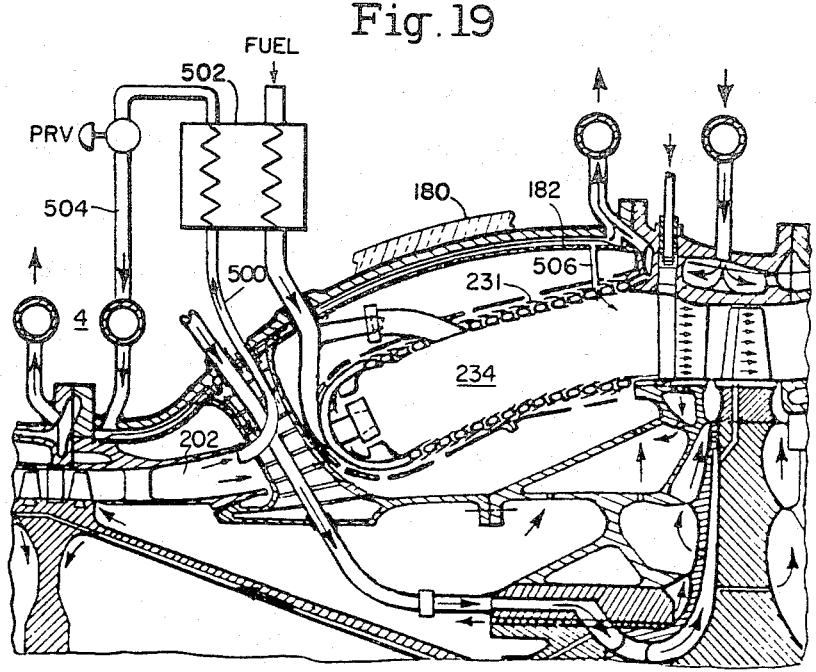
FIG. 19 is an enlarged view of FIG. 3 illustrating an air-cooled combustor outer spherical casing.

The same general principle as described above can be applied to an aircraft gas turbine by extracting air at the compressor diffuser exit 202 at impact pressure (about 1% higher than compressor discharge) (see FIG. 19). The extraction air received by inlet pipe 500 can then be externally cooled at heat exchange area 502 which can use incoming fuel as the air coolant. The cooled air is readmitted at Station 4 via pipe 504. The air can then be allowed to enter the cavity 231 around the combustor 234 near the first stage nozzle vane of gas generator turbine 30 through multiple orifices 506 in combustor housing bladder 182. This technique would allow a 50% reduction of outer spherical-shell material and would save about 250–300 lbs. of weight per engine of a 50,000 lb. thrust size (CF6, JT9, RB-211). Take-off pressure and shell temperature are critical items to cope with for an aircraft engine.

COMPRESSOR SHAFTS AND DISCS

Once the outer compressor casing and discharge housing are steam cooled to control the thermal expansion thereof, the inner compressor discs 136 and compressor conical shaft 134 must be cooled to control the thermal-radial growth of these parts. Steam is used as the coolant. The radial expansion of these rotating parts must match the radial growth of the outer casings.

A small portion of steam entering steam line 206 through strut 188 is taken from the small-diameter steam seal 208 through steam passage 210 and is brought up through passage 204 inside of conical shaft 134. This steam cools shaft 134 and then flows through passages 212 on the outer periphery of compressor discs 136 (see arrows 214). This steam then impinges on the outer disc surfaces and fills the cavities 216 between the compressor drum 134 and high pressure shaft 33. The coolant steam escapes under the first stage turbine rotor disc 218 as indicated by the arrows.

The entire inner cavity of compressor 26 is filled with coolant steam (550° F. vs. 1100° F. for air). Struts 188 that retain the inner cavity support members, inner pressure cylinder and steam seal are also steam cooled by steam entering Station 4.

COMBUSTION LINER

The compressor discharge temperature of a 40 cycle pressure ratio gas generator reaches about 1100° F. Air at this temperature is rather hot to be used as a combustion liner coolant, particularly where radiant heat is great and air is needed for $NO_x$ control. The amount of air available for liner cooling because of the $NO_x$ control requirements is reduced to about 32% of the total flow which, in turn, necessitates special liner cooling techniques to limit the liner peak metal temperature to about 1600° F.

Steam cooling in a closed cycle steam cooling system can be used to augment the cooling made available by the 32% cooling air. Lower peak metal temperatures can be achieved and an overall lower combustor pressure drop can be realized. Additionally, precious important pressure can be saved by using steam to do a large portion of the critical radiant heat-flux cooling. A 40 psi steam pressure drop is available between the steam turbine cold steam header V and the hot return steam header X to produce the required liner-cooling flow.

Figure 17:
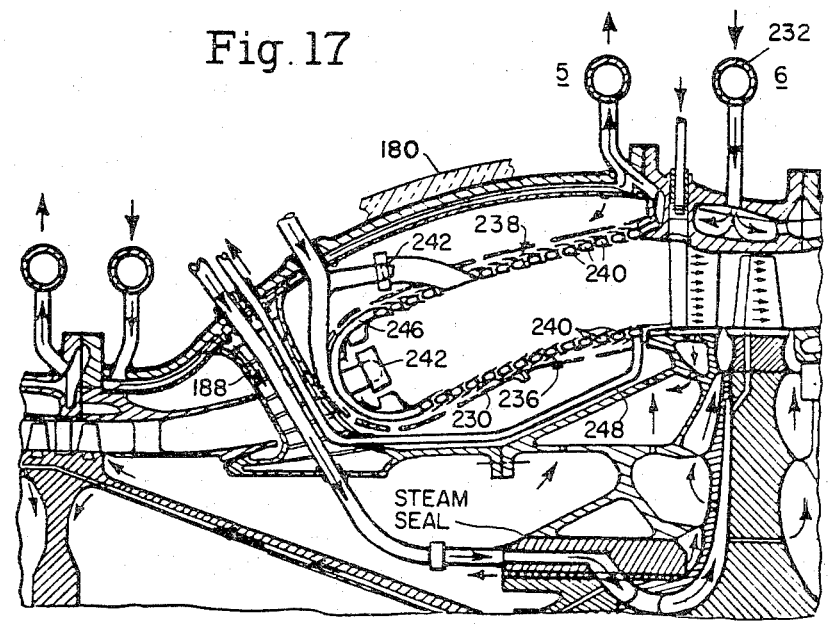
FIG. 17 is an enlarged view of FIG. 3 illustrating a steam-cooled combustion liner.
Figure 18:
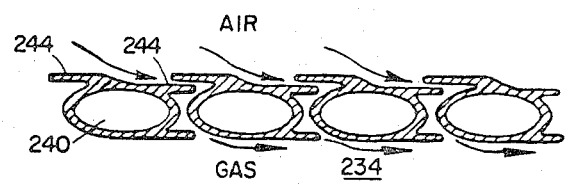
FIG. 18 is an enlarged view of FIG. 17 illustrating the coolant steam coils.

A novel steam cooled combustion liner can be used in place of the air cooled combustion liner 230 illustrated in FIG. 3. The novel steam-cooled combustion liner is illustrated in FIGS. 17 and 18. Steam at about 604 psia and 730° F. is brought in at Station 6 (pipe 232) where a portion is taken to cool combustion liner 230. The differential pressure between the compressor discharge (588 psia) and the steam (604 psia) is very low. Tubing blow-out strength is not an important factor. Thus, small diameter flattened tubing can be used for steam cooling. The annular combustor flow indicated by reference number 234 is produced by the use of inner steam coils 236 and annularly spaced outer steam coils 238 similar to what is proposed for the reheat combustor in applicant's prior patents and pending U.S. patent applications discussed above. The individual coils 240 are positioned closely together to provide and control the required air-side pressure drop between the compressor discharge and the combustion cavity 234. The fuel nozzles 242 are spaced evenly about the circumference of combustion cavity 234 in the annular space between the inner and outer steam coils 236 and 238, respectively. Lips 244 can extend from both sides of the individual steam coils 240 to aid in the pressure and air flow control. The coils 240 can be either helically wound or arranged with flow pass parallel with the direction of combustion flow. FIG. 17 illustrates a helically-wound arrangement. Crossover lines 246 in front of the combustor dome feed the coolant steam from the outer set of cooling coils 238 to inner coils 236. The crossover lines 246 are shown in FIG. 17 near the upstream fuel nozzle 242. The heated coolant steam at 1000°–1100° F. flows out of the compressor-discharge housing through pipes 248 which run through the forward structural support struts 188 as shown in FIG. 17.

FIRST STAGE TURBINE DISC EXPANSION AND VANE COOLING

The main flow of steam through steam line 206 enters the rotating shaft 134 through openings in a rotating member 220 of the inner shaft. (See FIG. 3.) A separate piece 122 that is shrunk-fit on the shaft is used for the transition. The steam then passes up cavity 224 to the periphery of the first stage turbine disc 218. Small diameter steam lines 226 cut transversely through first stage turbine disc 218 from cavity 224 allow further steam cooling of the external surfaces of disc 218 (see arrows in FIG. 3). No heat exchange fins are present in cavity 224 to minimize pumping losses. The steam cools first stage turbine disc 218 and controls expansion thereof. Note that the disc hub 228 is not cut or disturbed as this is the region of highest stress. Steam from cavity 224 enters steam passage 225 out in disc 218 and flows to a steam plenum (not shown) in the interior of first stage blades B. Steam nozzles (not shown) direct steam from interior plenum onto the exterior surface of the blades. The steam coolant is lost to the stack.

Steam cooling of first stage nozzle vanes A is accomplished by directing steam through steam pipe 229 to the interior steam plenum. Steam is then directed across the exterior surface of vanes A as disclosed in applicant's U.S. Pat. No. 4,314,442.

TURBINE OUTER SHELL, STRUTS, INNER BARREL AND DIFFUSER COOLING

The gas-generator turbine shell 250 surrounding and downstream of the first-stage nozzle vane A, as well as the support struts 252 and diffuser 254 can all be cooled with 604 psia steam turbine cold steam from steam header V in a closed-cycle cooling system whereby the heated coolant steam is returned to the hot reheat return steam header W for readmission to the intermediate pressure steam turbine 40. The passage of the steam coolant serves two functions: one to cool the gas generator turbine parts and the other to heat the steam.

Reference is made to FIGS. 3 and 11 wherein steam enters turbine shell 250 at Station 6. Part of this steam exits at Station 5 and steam pipe 248 if the combustion liner is steam cooled. A majority of the steam entering Station 6 flows through steam chamber 256, placed in generator turbine shell 250, through support struts 252, through cooling steam chamber 258 of inner barrel 253, back out the struts 252 and then to Station 7 (pipe 260) where the steam temperature will be about 1000° F. This temperature can be as high as 1100° F. if necessary where the hot gas stream between the first and second stages is about 1900° F. for a 2600° F. turbine inlet temperature, 40 cycle pressure ratio gas generator.

The stationary shroud 262 that surrounds the first-stage rotating blades B is made in segments 264 that fit in the grooves in the casing 250. The surface of the segments 264 which are exposed to the hot gases are coated with a ceramic heat barrier 266 which is commonly used in aircraft gas turbines. Above and adjacent to the stationary shroud 262 is a coolant steam isolation chamber 268. Within the interior surface of chamber 268 are a series of extended surface fins (not shown) about 1/20 inch thick and 3/32 inch apart. Steam chamber 268 is fed with 620 psia saturated steam at 490° F. via steam pipe 269. The fins greatly increase heat transfer and provide a fast thermal response. The steam flow in coolant steam isolation chamber 268 is controlled and varied by the micro-processor through a pressure relief valve The inner cylindrical wall 270 of shell 250 is thus cooled or allowed to heat to control the radial thermal expansion of shell 250. The inner-radial shell expansion must match the overall radial expansion of the discs 218 and 272 and rotating blades B and C' to maintain blade-tip clearance.

Special attention must be placed on cooling struts 252 and the internal duct passage 274 between the gas generator first-stage blading B and second-stage nozzle C. Passageway 274 carries hot gas at 1900°–2000° F. at a pressure of about 200–220 psia.

New techniques for bonding ceramic material to metal parts with an underlay of pliable material have been developed the past few years to provide a thermal barrier. These new application techniques are available from various companies. For example, a 0.010 inch thickness of plasma sprayed bond coat of NiCrAlY and an 0.030 inch overcoat of ytria-stabilized-zirconia ceramic will provide a temperature difference between the gas and metal of 335° F. to 635° F., depending on the gas temperature level and flow conditions. The zirconia has a low conductivity of 0.75 BTU/hr/ft$^2$/°F. and the NiCrAlY conductivity is only 3.9 BTU/hr/ft$^2$/°F. These conductivities account for the high temperature drop.

The surface of the annular ducting or passageway 274 is coated with such a ceramic thermal barrier 276 to reduce the metal temperature about 400° F. The steam cooling of outer shell 250 and inner barrel 253 will reduce the metal surface temperature further to an acceptable level of about 1400° F. depending upon the amount of steam cooling.

In accordance with the present invention as depicted in FIGS. 12 and 13, strut 252 can be isolated or shielded from the 2000° F. gas stream by surrounding or cladding strut 252 with a series of small diameter stainless steel (superalloy) tubes 278 and 3/32 inch in diameter with the tubes being arranged parallel to the main gas flow and positioned so as to touch each other. Coolant steam flows through individual tubes 278 from inlet header 280 which receives coolant steam from the flow of steam through steam chamber 256. The wall thickness of these soda-straw sized tubes 278 should be very thin for good heat transfer. According to the hoop stress equation (2) for a thin-shell casing, the thickness for an allowable 20,000 psi stress and a 400 psi pressure differential calculates to be 0.001 inch. The tube-wall thickness, for practical considerations, therefore, can be 0.008 to 0.010 inch, one magnitude greater. The leading edge inlet header 280 and trailing edge outlet header 282 can be about ¼ inch in diameter with a wall thickness of about 0.015 to 0.020 inch even though 0.003 inch would be sufficient to carry the pressure. These tubes can be flattened and shaped to match the contour of strut 252. Each small tube 278 is welded to the inlet and outlet headers 280 and 282, respectively. The outer surfaces of the steam-tube shield are coated with a ceramic thermal barrier 284. Sheet superalloy steel may be wrapped around the headers and the tubing inside and out and welded to the individual headers to form a pressure-tight seal.

The small-diameter tubes 278 welded to the respective inlet and outlet headers 280 and 282, respectively, form a tube-shielding sleeve assembly which can be slipped over each strut. The open ends 286 and 288 of inlet and outlet headers 280 and 282, respectively, are welded to the inside wall 271 of steam chamber 256. The tube-shielding sleeve assembly is free to float up and down around strut 252 as the gas stream temperature changes and as the strut is expanded or retracted to control blade-tip clearance.

The thermal barrier system over the struts and on the outer surface of the steam-cooling tubes 278 provides a triple thermal barrier to the strut: first ceramic thermal barrier 284 on tubes 278, second steam-tube shielding 278, and third an optional ceramic thermal barrier 290 on the strut itself. The triple shielding thermal barrier system will allow the strut metal temperature to be as low as 800° F. Reduced cooling steam flow will allow the strut to heat to 1500° F. if need be and grow thermally accordingly to match the required blade and disc growth. Outer casing 250 is preferably kept at a temperature of 700°–800° F. by steam entering at 730° F. at Station 6. Referring again to FIGS. 12 and 13, strut 252, typically six inches wide, six inches high, and one and one-half inches thick has a series of closely-spaced holes 292 electro-machined or cast in shell 294 and in communication with steam flow in chamber 256. Holes 292 are preferably about 1/6 inch to 3/32 inch in diameter. Each hole 292 comprises riflings 296 broached spirally along the longitudinal surface of shell 294. The riflings provide ridges at a pitch of about 5 rib spirals per inch. Each rib that is formed is about 0.020 inch wide and thick. Riflings 296 offer three distinct functions: (1) they spin the steam to provide a much longer flow path, (2) they provide extended surface area for heat transfer, and (3) they provide a way to create a steam turbulence to increase heat transfer.

Internal cores or sheet metal inserts 298 and 300 are used inside the front and back steam passages 299 and 301, respectively of strut 252 to force the cooling steam to flow next to the strut ribs 302. Heat transfer is thus improved. Secondly, a pressure drop is created to force some of the steam through the outer rifling holes 292 and the tube-shielding sleeve assembly. As the cooling steam is increased, a greater pressure drop occurs which, in turn, forces more steam through the rifling holes and shielding sleeve assembly.

The cooler steam passes through the front or leading edge 299 of strut 252, and the hotter steam, heated by the inner barrel 253 which includes baffle 304 to provide full coolant steam circulation therethrough, passes through the trailing edge 301. Therefore, the slight temperature difference will cause the leading edge 299 to tilt the outer shell 250 inward to reduce tip clearance of the first-stage rotating blade B.

The blade-tip clearance of second-stage rotating blade C′ is controlled by the cooling steam flowing through steam chamber 256 before exiting at sation 7. It may be possible to provide a separately controlled cooling circuit for the second stage if needed, but tip control at second stage C′ is not as critical as for the first stage.

Referring to FIGS. 3 and 11, diffuser 254 is also cooled with 604 psi steam which flows through inner and outer diffuser shells 305 and 306, respectively, from station 8 (pipe 308) to exit station 9 (pipe 309). Aft straightening vanes 310 contain flow dams 312 which separate steam flow and provide passages to and from steam chambers 305 and 306 of the diffuser. The temperature of the gas flowing through the diffuser is at a level of about 1740° F. for a 2600° F. turbine inlet temperature gas generator. Cooling either by air or steam is thus necessary. The micro-processor mini-computer 156 controls the flow of steam to stations 6 and 8 through separate pressure-control valves.

SECOND STAGE VANES, DISCS AND BLADES

Steam at about 350 psia saturated temperature enters the second-stage nozzle vanes C at steam pipe 314. Steam for cooling the second stage disc and blades C′, passes through rear-steam seal 316, flows up the inside second-stage shaft cone 318, and to the second-stage discs and blades C′. The steam flowing through the shaft cone 318 and disc 272 cools these parts and thus controls their radial-thermal expansion. The steam flowing through the outer turbine shell 250, struts 252, inner barrel 253 and diffuser 254 controls radial-thermal growth and blade-tip clearance. Temperatures of the outside stationary parts have to relate to the temperatures of the inside rotating parts including disc 272, shaft cone 318 and associated low pressure shaft 35 in order to accomplish thermal-expansion control.

FIRST AND SECOND-STAGE SHROUDS

Thermal barrier ceramic coatings 266 and 320 are used on stationary turbine shrouds 262 and 322, respectively, that surround the rotating blade tips of first and second-stage rotating blades B and C′, respectively. The ceramic coating restricts the flow of heat to turbine shell 250 and helps control expansion.

It is important that the outer turbine shell, inner barrel and struts have a fast thermal response. The cooling steam flow must accomodate a rapid change in firing temperature particularly during start-up and rapid load changes. Otherwise, tip rubbing will occur with a possible loss of blades. When very close blade-tip clearances are considered, the rapid thermal response is necessary. This response is required to match and exceed the radial growth or shrinkage rate of the rotating blades and associated discs. A fast response is accomplished by incorporating extended finned surfaces on the hot side of shell 250 such as shown in FIG. 9, which is typical for outer shell 250, struts 252, inner barrel 253, diffuser 254 and isolation steam chamber 264. Specifically, shell 250 includes extended fins 324 on the hot side. The exterior wall of shell 250 can be provided with insulation 326. The exact design regarding the number of fins 324 and spacing thereof requires extensive analysis of the discs, blades, shells, struts, and drum. Fins, however, successfully cool air-cooled aircraft internal combustion reciprocating engines, and steam has been shown in applicant's prior applications to be a far better coolant than air. The large parts make extended surface fins possible with a great enough total surface area required.

STEAM MIXER

Figure 2:
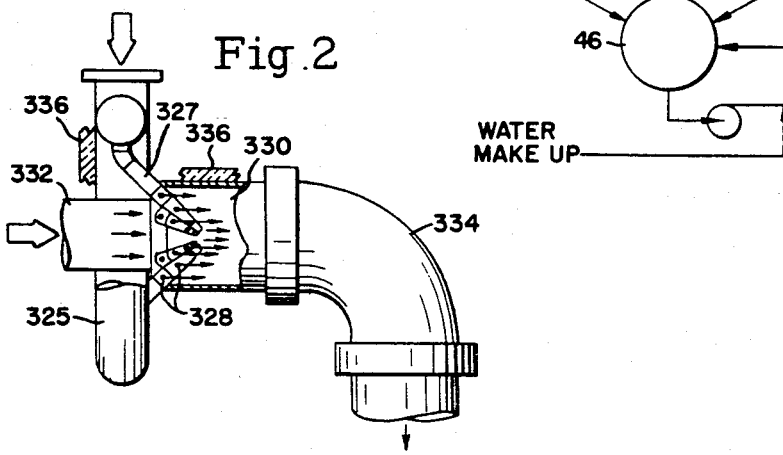
FIG. 2 is an elevational view partially in cross-section of the steam cross-over mixer between the intermediate pressure and low pressure steam turbines.

The configuration of steam mixer O can vary widely and as such the crossover steam mixture shown is only one of numerous possible designs. Referring specifically to FIG. 2, double reheated steam enters crossover steam mixer O via a donut-shaped steam header 325. Associated with steam header 325 are a plurality of spaced steam mixing nozzles 327 each of which includes a plurality of orifices 328 at the exit end thereof to disperse and mix the hot steam into the cool steam from the exhaust of steam turbine 40. The exit end of nozzles 327 communicates with steam mixing chamber 330 which receives the exhaust steam from intermediate pressure steam turbine 40 via steam pipe 332. Mixing chamber 330 is preferably cylindrical. Steam from steam pipe 332 is discharged into steam mixing chamber 330 in a longitudinal direction while steam nozzles 327 are preferably orientated circumferentially around the inner surface of mixing chamber 330. The mixed steam enters low pressure steam turbine 42 via steam pipe 334 which contains a right-angle turn to low pressure turbine 42. The right-angle turn aids the mixing process and stabilizes temperatures. Steam header 325 and mixing chamber 330 may be provided with exterior insulation 336.

TEMPERATURES, EXPANSION, MATERIALS AND BLADE-TIP CLEARANCES

The discs and casings where air is used as the coolant run hotter in high pressure ratio gas turbines than on earlier low cycle pressure ratio units. Extra care must be taken, as a result, in the selection of the material to make sure they possess the required strength and exhibit compatible thermal expansion for blade-tip control. New air cooling tecniques and more advanced superalloy materials are being developed to cope with the new temperature-pressure conditions.

Steam, shown to be a superior coolant to air, offers a way to cool the discs and casings to a lower temperature. The last-stage compressor disc, for instance, can be cooled to an average hub to rim temperature of 600° F., whereas the air cooled disc will operate at a comparable temperature of about 800°–900° F. Similarly, steam cooled turbine discs will operate at a 600° F. level vs. 900° F.–1000° F. for air cooling. Also a much greater temperature differential for air cooling will take place between hub to rim. Cooling the discs greatly increases allowable stress levels but, on the other hand, it upsets the balance between casing thermal growth and disc thermal growth. Steam cooling of the outer casing and stationary parts then, as previously discussed, becomes necessary so that blade-tip clearance can be controlled and maintained.

Steam is made available from a small boiler before the gas turbine is started. Steam is introduced to the gas turbine rotors, blading and casings in a controlled manner to warm up these parts to about 300° F. before the gas turbine is fired. This warm-up reduces thermal shock considerably and allows positive blade-tip clearance control before start-up. Clearances can be opened up for light-off by steam heating and thus expanding the outer casings. After the gas turbine is running and up to speed, steam flow to the discs, blading and casings is regulated to control tip clearance. The mini-computer/-micro-processor provides the proper signal to control cooling steam to the various parts. Steam cooling also is automatically adjusted in case the gas turbine experiences a sudden load change requiring either an increase or decrease in firing temperature. Likewise, in the case of a full load trip, the amount of cooling steam to the shell and discs can be adjusted to insure proper casing and disc thermal expansion and thus tip clearance.

The discs have a greater thermal capacity and a slower response time than the casings, particularly in regard to the compressor. It is a distinct advantage, therefore, to use steam as a coolant to control both disc and casing expansion during coast down and static cool down. Steam from an accumulator or extracted steam from the steam turbine can be used. The outer compressor casing in an air-cooled turbine tends to cool off faster than the discs and tip rubbing can occur. "Squealer" tips on the turbine blade tips have a very thin extension that can rub away and prevent seizure. Rubbed tips, however, give greater running clearances and performance is thus lost. Steam cooling will prevent this loss and minimize the need for "squealer" tips. Blade-tip clearance control must be accurate, precise and reliable where close running clearances of 10 to 20 thousandths of an inch are contemplated. These clearances, under precise control, can be opened up to 60 to 70 thousandths of an inch during start-up and coast down to prevent any possible rub or seizure. Without blade-tip control and ample clearance of 60 thousandths of an inch has to be present all the time to protect against sudden temperature changes. This excessive clearance reduces both compressor and turbine efficiency during operation. Fuel consumption is increased and power output is reduced.

Growth of the rotating discs is brought about by two factors. First, the rotational or centrifugal forces cause the disc to elastically distort or expand. Second, the discs thermally grow as the temperature is increased. Outer casings experience elastic-hoop growth due to the pressure. The thermal growth can be readily varied and controlled. The thermal growth is about six times greater than the elastic strain and dominates. Conversely, the elastic growth tends to remain constant over the operating range of the gas turbine. Inner casings can experience elastic contraction due to compression forces.

Table 2 represents a tabulation of the material selection, material physical properties, growth values and outer casing temperatures required to maintain constant blade-tip clearance for the gas turbine.

TABLE II

STEAM-COOLED-REHEAT GAS TURBINE MATERIAL SELECTION AND TEMPERATURES FOR TIP CLEARANCE CONTROL
40 CPR - 2600/2400° F.

| | HP-COMP LAST STAGE | HP-GG Turbine 1st STAGE | LP-GG TURBINE 1st STAGE | PT TURBINE 1st STAGE |
|---|---|---|---|---|
| ROTOR | | | | |
| 1. Material | | | | |
| Disc | INCO 718 | INCO 718 | INCO 718 | INCO 718 |
| Blade | INCO 718 | U-700 | U-500 | U-500 |
| 2. E - Tensile Modulus PSI × $10^{-6}$ | | | | |
| Disc | 29.0 | 29.0 | 29.0 | 29.0 |
| Blade | 29.0 | 32.4 | 29.4 | 29.4 |
| 3. $\alpha$ - Mean Coef of Therm Exp in/in °F. × $10^6$ | | | | |
| Disc | 8.0 | 8.0 | 8.0 | 8.0 |
| Blade | 8.0 | 7.74 | 7.80 | 7.80 |
| 4. Thermal Conductivity BTU-in/(ft$^2$ hr °F.) | | | | |
| Disc | 135 | 135 | 135 | 135 |
| Blade | 135 | 143 | 127 | 127 |
| 5. Stress (average) - lb/in$^2$ | | | | |
| Disc | 40,000 | 40,000 | 40,000 | 40,000 |
| Blade | 5,000 | 10,000 | 10,000 | 10,000 |
| 6. $R_D$ - Radius of Disc - in | 16 | 19 | 23 | 28 |
| 7. L - Length of Blade - in | 2 | 3.5 | 4.5 | 5.0 |
| 8. $T_D$ - Temp of Disc (Avg) - °F. | 600 | 600 | 600 | 600 |
| 9. $T_B$ - Temp of Blade (Avg) - °F. | 1000 | 1400 | 1200 | 1400 |
| 10. $\Delta R_D$ - Growth of Disc - in | | | | |
| Elastic | .015448 | .018345 | .0222069 | .027035 |
| Thermal | .067840 | .080560 | .0975200 | .118720 |
| Sub-Total | .083248 | .098905 | .1197269 | .145755 |
| 11. $\Delta L$ - Growth of Blade - in | | | | |
| Elastic | .0003448 | .0010802 | .0015306 | .0017007 |
| Thermal | .0148800 | .0360300 | .0396630 | .0518700 |
| Sub-Total | .0152248 | .0371102 | .0411936 | .0535707 |
| 12. Total Growth - in | .098515 | .136015 | .160920 | .199325 |
| 13. Distribution | | | | |
| % Elastic | 16.0 | 14.3 | 14.8 | 14.4 |
| % Thermal | 84.0 | 85.7 | 85.2 | 85.6 |
| CASING | | | | |
| 14. Material | 12-CR-ST Type 422 | 12-CR-ST Type 422 | 12-CD-ST Type 422 | 12-CR-ST |
| 15. E - Tensile Modulus PSI × $10^{-6}$ | 30.6 | 30.6 | 30.6 | 30.6 |
| 16. $\alpha$ - Mean Coef of Therm Exp in/in °F. × $10^6$ | 6.7 | 6.7 | 6.7 | 6.7 |
| 17. Thermal Conductivity BTU - in/(ft$^2$ hr °F.) | 196 | 196 | 196 | 196 |
| 18. Pressure - PSIA | 565 | 500 | 250 | 100 |
| 19. Stress (avg w/Stiffeners) lb/in$^2$ | 20,000 | 20,000 | 10,000 | 5,000 |
| 20. $R_c$ - Radius of Casing - in | 18.0 | 22.5 | 27.5 | 33.0 |
| 21. $\Delta R_c \cdot \Delta R_D + \Delta L$ - in | .098515 | .136015 | .16092 | .199329 |
| 22. % of Radius | .547 | .605 | .585 | .604 |
| 23. $T_c$ - Casing Temp - °F. | 789 | 875 | 895 | 947 |

It can be noted that approximately 15% of the growth is attributed to the elastic growth and that 85% comes from the thermal growth; therefore, the thermal growth is dominant and blade-tip clearance control must be accomplished through temperature control of the discs and casing. Also, it can be observed that the total growth is appreciable in amounts to about 0.5% of the radius as given in line 22 of Table 2.

The casing calculated temperatures, line 23 of Table 2 indicate that the steam temperatures available are some 200° F. below the casing temperatures which provides a reasonable delta temperature between the cooling steam and the various casings. The cooling system of the present invention is entirely practical and lends itself to temperature control to the different casing segments.

The casing temperatures, line 23, clearly show that the compressor discharge casing will operate at a lower temperature than the gas generator turbine first-stage casing by some 87° F. These figures show the need for the internal stainless-steel combustion casing bladder to isolate the compressor discharge temperature and the need for the required direction of flow of the cooling steam from compressor discharge to the gas generator turbine.

Figure 16:
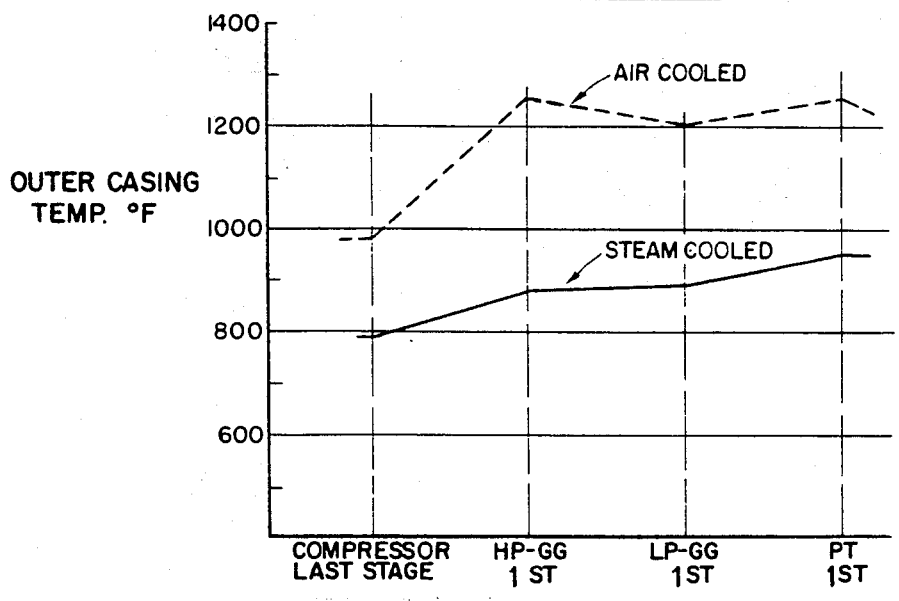
FIG. 16 is a graph of typical average steam-cooled casing temperatures compared with air-cooled values.

The casing metal temperatures of an air-cooled high cycle pressure ratio gas turbine by necessity will be considerably higher than the casing temperatures of the similar steam cooled gas turbine of the present invention. Reference is made to FIG. 16 which shows typical temperatures for an air-cooled unit on top and calculated temperatures for a steam cooled unit on the bottom. The difference in temperatures can be noted to be about 400° F. The air-cooled casings must operate at the elevated temperatures because the discs operate at much higher temperatures due to the elevated temperature of the compressed air used as the coolant. The cooling air temperature to the first-stage disc would be about 1000° F. inlet compared to about 500° F. saturated steam. Also the specific heat of steam is twice that of air, thus offering a greater heat sink. The air-cooled outer casing must operate without any insulation, whereas the steam-cooled casing has a heat retention insulation covering to prevent heat leakage and a loss to the cycle. The insulation also affords a way to control outer metal skin temperature under varying ambient temperature conditions.

It can be shown that a 100° F. increase or decrease in casing temperature will increase or decrease blade-tip clearance respectively as follows:

(1) Compressor last stage 0.0121 inch,
(2) Gas generator turbine first stage 0.0158 inch,
(3) Gas generator turbine second stage 0.0184
(4) Power turbine first stage 0.0221 inch.

The magnitude of these values are practical for an engine of the size required with an air flow of 300 lbs/sec and indicates that an initial blade-tip clearance at ambient temperature of the engine could be in the order of 0.020 inch and that this magnitude of clearance could be maintained under all running conditions. It is important to insulate the outside of the casing so that the casing temperatures can be maintained by the cooling steam. Aircraft gas generator using ambient air cooling do not have the outside of the casings insulated. Air is forced over the outer surface in an unregulated manner by fans to cool the casing as required. The heat is rejected with the atmospheric pressure cooling air and the rejected heat is lost from the cycle. This heat is retained in the steam cooled arrangement. It is not lost from the combined cycle.

The materials which can be selected for the discs, blades and outer casings are typical for presently designed modern gas turbines. Future gas turbines using advanced powdered superalloy metallurgy for discs and single grain crystals for the turbine blades will become available for industrial gas turbines in several years. The casings can be generally fabricated out of a high alloy steel as shown in line 14 of Table 2. It can be noted that this type of material has a much lower coefficient of thermal expansion than the disc ($6.7 \times 10^{-6}$ vs. $8.0 \times 10^{-6}$.) Therefore, the casing can operate at a higher temperature than the disc (800° F. vs. 600° F.) to be compatible with the cooling steam.

Another factor which can be observed from Table 2 relates to conductivity and the response rate of the casing relative to the discs. It can be seen that the thermal conductivity of the casing material is notably greater than for the discs (196 vs. 135). Therefore, the casing should respond faster to the steam cooling than the discs assuming equal specific heats of the different alloys. The casings, being thin and less massive in the disc, can be expanded or contracted as necessary at a faster rate than the discs and independent of the discs to control blade-tip clearances at all times; pre-start, warm-up, start-up, running, load changing, tripouts, coast-downs and static-cool-down.

It appears at the present time that a 38 cycle pressure ratio is about as high as economically feasible for aircraft engines. When the cycle pressure ratio is increased above this value any gain in cycle efficiency is offset by the added weight of the compressor casing, combustor housing and turbine shells. Also the higher compressor discharge temperature necessitates heavier last-stage compressor discs.

When considering a modified steam-cooled gas generator as set forth by the present invention, there is no reason why an industrial gas generator could not be designed for a 40 to 44 cycle pressure ratio to optimize the reheat gas turbine double reheat steam turbine combined cycle for the higher 2600° F. turbine inlet temperature contemplated.

The coolant steam flow rates for the gas generator shell, struts, barrel, etc. are very small compared to the total air flow of the gas generator. These flow rates are also small compared to the primary coolants for the nozzle vanes and rotating blades and are perhaps only 15% of these primary values. The power turbine cooling flow rates are much higher.

The core flow rate of a 50,000 lb. thrust fan jet gas generator is about 275 lbs/sec. The total steam cooling rate for primary cooling open system (gas generator blading) is calculated to be about 6% of the air flow or 16.5 lbs/sec (59,400 lbs/hr) which is a considerable amount of steam. It is estimated that the compressor casing, tubing shell, strut, barrel and diffuser total-steam flow would be about 9,000 lbs/hr in a closed system where no steam is lost.

The steam flow is available from the 604 psia first cold steam header V and the 140 psia second steam reheat header Y for the 2400 psig steam-turbine arrangement. Ample pressure is available to force the steam through the various passages and extended surface fins. There is about a 50 psi total pressure present from the steam turbine reheat pressure drop. In the case of the 604 psia steam, the flow will be part of the reheat combustor cooling steam where there is an ample pressure drop present. In the case of the 140 psia extraction steam available there is an adequate pressure drop of 20 psi to provide the working force for cooling flow.

In crossover steam mixer O, the hot 1100° F. steam at 123 psia mixes with the cooler 669° F., 120 psia steam from the exhaust of steam turbine 40. The 3 psi pressure differential (about $2\frac{1}{2}\%$ pressure drop) should be ample to obtain good steam mixing. The homogenous mixture of steam at 850° F. enters the center inlet scroll to the double flow low pressure steam turbine 40.

POWER PLANT CAPACITY AND LAYOUT

The output of a projected reheat gas turbine power plant can be determined using the data present in Table 1. An inlet air flow of 275 lbs/sec at sea level and 59° F. is calculated to produce a gas turbine output of 95,837 KW when considering 2% turbine and generator loss. This air flow rate is the same as currently consumed by the LM 5000. The network in BTU/lb of air is multiplied by the air flow in terms of lb/hr and divided by 3413 BTU/KWH for this calculation. The steam turbine associated with the 275 lbs/sec gas turbine is calculated to produce a net 39,610 KW when the boiler feed pump work and a 2% turbine and generator loss are subtracted.

A combined cycle power plant consisting of three double ended gas turbine generator sets (6 reheat gas turbines) and one steam turbine generator set would produce a total of 812,682 KW with the 3 twin gas turbine generators sets developing 575,022 KW and a single steam turbine generator developing 237,660 KW. A conceptual layout of the plant could comprise a steam turbine located in the center with the gas turbine situated behind and to the sides of the steam turbine. Steam headers would supply steam between the 6 heat recovery boilers, the single steam turbine and the six gas turbines. The prospect of using multiple reheat gas turbines and heat recovery boilers to feed a single reheat steam turbine adds flexibility by allowing individual gas turbine/spoiler units to be removed from service, inspected, repaired, and placed back into service without shutting down the entire plant. This practice of using critical multiple units coupled with non-critical single units is commonplace in large refineries and petrochemical plants today and accounts for long runs between overall shutdown.

What is claimed is:

1. In a method of producing work in a gas generator, said gas generator including a gas compressor, a combustor downstream of said compressor and a gas turbine downstream of said combustor, compressing ambient air by means of rotating blades within said compressor, igniting a combustible fuel in the presence of said compressed air in said combustor to form an exhaust gas and expanding said exhaust gas through the blading of said gas turbine, said compressor comprising an outer shell confining said rotating blades, and further controlling the tip clearance of at least a portion of said rotating blades relative to said outer shell by passing a controlled amount of coolant in heat exchange relationship with said outer shell to shrink or expand said outer shell, the improvement comprising; wherein said outer compressor shell comprises hollow steam chambers contained therein and an inner casing in contact with said compressed air and an outer casing annularly spaced from said inner casing, controlling the blade-tip clearance of said rotating blades within said outer compressor shell by passing coolant steam through said hollow steam chambers to provide heat exchange with said compressor shell to shrink or expand said compressor shell and further directing air or steam as a thermal barrier in said annular space between said inner and outer casings of said compressor shell.

2. The improvement of claim 1 comprising directing air as a thermal barrier in said annular space between said inner and outer casings of said compressor shell at the low pressure portion of said compressor wherein the ambient air enters the compressor and directing steam as a thermal barrier in said annular space between said inner and outer casings of said compressor shell at the high pressure portion of said compressor wherein said ambient air exits said compressor.

3. The improvement of claim 1 comprising passing said coolant steam in heat exchange relationship with said compressor shell in the same direction as ambient air flow through said compressor.

4. The improvement of claim 1 wherein said rotating blades within said compressor shell are associated with a rotating shaft, cooling said rotating shaft by passing coolant steam in heat exchange relationship with said shaft.

5. The improvement of claim 4 wherein said rotating blades of said compressor are associated with said compressor shaft by means of rotating discs connecting said rotating blades with said shaft, cooling said rotating discs by passing coolant steam from said heat exchange relationship with said shaft to a location in heat exchange relationship with said discs.

6. The improvement of claim 1 wherein said outer casing contains said hollow steam chambers, said compressor shell further comprises a plurality of radial support struts positioned circumferentially around the surface of said outer casing and spaced along the length of said compressor shell, said radial support struts extending radially from a location adjacent to said inner casing to a point beyond said outer casing, said radially support struts containing elongated steam chambers, shrinking or expanding said compressor shell by passing a controlled amount of coolant steam through said elongated steam chambers in said radial support struts.

7. The improvement of claim 6 wherein said hollow steam chambers contained in said outer casing communicate with said elongated steam chambers in said radial support struts, passing said coolant steam through said hollow steam chambers contained in said outer casing and into said elongated steam chambers in said radial support struts.

8. The improvement of claim 7 wherein said inner casing contains orifices to provide passage of air from within said compressor shell to said annular space, directing ambient air within said compressor shell through said orifices to said annular space between said inner and outer casings.

9. The improvement of claim 7 wherein said elongated steam chambers contain orifices to provide passage of coolant from said elongated steam chambers to said annular space, directing steam from said elongated steam chambers through said orifices into said annular space between said inner and outer casings.

* * * * *